US009557912B2

(12) United States Patent
Park et al.

(10) Patent No.: US 9,557,912 B2
(45) Date of Patent: Jan. 31, 2017

(54) DISPLAY DEVICE AND CONTROLLING METHOD THEREOF

(71) Applicant: LG ELECTRONICS INC., Seoul (KR)

(72) Inventors: Mihyun Park, Seoul (KR); Woohyoung Shin, Seoul (KR); Taehoon Cho, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/880,853

(22) Filed: Oct. 12, 2015

(65) Prior Publication Data
US 2016/0364135 A1 Dec. 15, 2016

(30) Foreign Application Priority Data

Jun. 15, 2015 (KR) ........................ 10-2015-0083951

(51) Int. Cl.
*G06K 5/00* (2006.01)
*G06F 3/0488* (2013.01)
*G06K 7/10* (2006.01)
*H04W 4/00* (2009.01)

(52) U.S. Cl.
CPC ....... *G06F 3/04883* (2013.01); *G06K 7/10297* (2013.01); *H04W 4/008* (2013.01)

(58) Field of Classification Search
CPC ........ G06Q 20/32; G06Q 20/20; G06Q 20/40; G06Q 20/105; G06Q 20/227; G06Q 20/322; G06Q 20/3278; G06Q 20/351; G06Q 20/3572; G06Q 20/36; G06Q 20/3674; G06Q 20/405; G06Q 40/00; G06K 2209/01

USPC ................ 235/380, 375, 381, 492, 486, 487
See application file for complete search history.

(56) References Cited

U.S. PATENT DOCUMENTS

| | | | | |
|---|---|---|---|---|
| 2003/0158762 | A1* | 8/2003 | Wu ..................... | B64D 11/0007 705/5 |
| 2010/0082481 | A1* | 4/2010 | Lin ...................... | G06Q 20/042 705/41 |
| 2011/0180598 | A1* | 7/2011 | Morgan ................ | G06Q 20/02 235/380 |
| 2011/0295748 | A1 | 12/2011 | Woodriffe | |

(Continued)

FOREIGN PATENT DOCUMENTS

| | | |
|---|---|---|
| EP | 2674889 | 12/2013 |
| EP | 2701107 | 2/2014 |

OTHER PUBLICATIONS

European Patent Application No. 16160489.7, Search Report dated Nov. 7, 2016, 8 pages.

*Primary Examiner* — Thien M Le
(74) *Attorney, Agent, or Firm* — Lee, Hong, Degerman, Kang & Waimey

(57) ABSTRACT

Disclosed are a display device and controlling method thereof. The present invention includes a communication unit configured to perform a communication with a terminal device located in a preset distance, the communication unit configured to receive terminal device's information including an identifier of the terminal device, a controller determining whether a card included in a card group exists by searching the card group associated with the received terminal device's identifier, and a display unit, wherein if the card included in the searched card group exists, the controller displays a main card and wherein if the card included in the searched card group does not exist, the controller outputs a notification message.

20 Claims, 24 Drawing Sheets

(56) References Cited

U.S. PATENT DOCUMENTS

| | | | | |
|---|---|---|---|---|
| 2012/0166334 A1* | 6/2012 | Kimberg | ............... | G06Q 20/401 |
| | | | | 705/44 |
| 2012/0197741 A1* | 8/2012 | Carlegren | ............... | G06Q 20/20 |
| | | | | 705/16 |
| 2013/0234528 A1* | 9/2013 | Kargl | ....................... | H02J 5/005 |
| | | | | 307/104 |
| 2014/0162598 A1* | 6/2014 | Villa-Real | ................ | H04M 1/66 |
| | | | | 455/411 |
| 2014/0168477 A1* | 6/2014 | David | ................. | G06Q 30/0601 |
| | | | | 348/240.2 |
| 2014/0194148 A1* | 7/2014 | Griffin | ................... | G01C 21/32 |
| | | | | 455/456.3 |

* cited by examiner

DISPLAY DEVICE AND CONTROLLING METHOD THEREOF

Pursuant to 35 U.S.C. §119(a), this application claims the benefit of earlier filing date and right of priority to Korean Application No. 10-2015-0083951, filed on Jun. 15, 2015, the contents of which are hereby incorporated by reference herein in their entirety.

BACKGROUND OF THE INVENTION

Field of the Invention

The present invention relates to a display device, and more particularly, to a display device and controlling method thereof.

Discussion of the Related Art

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

Meanwhile, a user generally possesses various kinds of cards. For instance, a user may possess a credit card for payments, a debit card, a cash withdrawal card for cash withdrawal, a key-card for opening a door lock, a card for a transportation means, a ticket for entry into a specific place, and the like. When a user carries a number of cards, it may cause inconvenience to the user and raise the possibility of loss. Thus, the demand for a technology of using a plurality of card informations loaded on a terminal is increasingly rising.

SUMMARY OF THE INVENTION

Accordingly, embodiments of the present invention are directed to a display device and controlling method thereof that substantially obviate one or more problems due to limitations and disadvantages of the related art.

An object of the present invention is to provide a display device and controlling method thereof, by which a plurality of card informations can be inserted in a single display device and by which a single card can be recommended in consideration of a nearby external device.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a display device according to one embodiment of the present invention may include a communication unit configured to perform a communication with a terminal device located in a preset distance, the communication unit configured to receive terminal device's information including an identifier of the terminal device, a controller determining whether a card included in a card group exists by searching the card group associated with the received terminal device's identifier, and a display unit, wherein if the card included in the searched card group exists, the controller displays a main card and wherein if the card included in the searched card group does not exist, the controller outputs a notification message.

Preferably, the display device may further include an input unit disposed on a prescribed lateral side of the display unit, the input unit configured to receive an input of a touch gesture. If f a swipe gesture of moving in a direction of the display unit is inputted through the input unit, the controller may control the display unit to display a card region appearing from a lateral side adjacent to the input unit in the lateral side of the display unit. After the card region has been displayed, the controller may control the communication unit to perform the communication with the terminal device located in the preset distance. And, the controller may control the display unit to display the selected main card in the card region.

More preferably, the input unit may include a fingerprint recognition sensor. When the touch gesture is inputted, the input unit may further receive an input of a fingerprint information. If the inputted fingerprint information matches a saved fingerprint information, the controller may control the display unit to display the card region.

Preferably, the display unit may include a fingerprint recognition sensor. After a card application has been launched, if a fingerprint information is inputted through the display unit, the controller may compare the inputted fingerprint information to a saved fingerprint information. If the inputted fingerprint information matches the saved fingerprint information, the controller may control the communication unit to perform the communication with the terminal device located in the preset distance.

Preferably, if the controller receives informations of a plurality of terminal devices including different identifiers, respectively, the controller may control the display unit to display a selection menu for selecting the terminal devices based on the different identifiers.

Preferably, the identifier may include at least one of a payment device identifier indicating a payment terminal device, a withdrawal device identifier indicating a cash withdrawal terminal device, a personal device identifier indicating a personal terminal device, a ticket device identifier indicating a ticket check terminal device, and a door lock identifier indicating a digital door lock.

More preferably, if the identifier includes the payment device identifier, the controller may search at least one of a credit card group and a debit card group.

In this case, the controller may select and display the main card based on statistical information of a user's use pattern and the controller may display a card set by the user as the main card.

And, the controller may make a payment through the terminal device by setting the main card displayed on the display unit as a payment card.

Moreover, if the information of the terminal device comprises membership information, the controller may further search a membership card group and may select a membership card corresponding to the membership information.

Furthermore, if a preset command is inputted to the main card displayed on the display unit, the controller may display a separate card layer and the selected membership card.

More preferably, if the information of the terminal device includes a unique bank information and the identifier includes the withdrawal device identifier, the controller may search a cash withdrawal card group and select a cash withdrawal card corresponding to the unique bank information as the main card.

More preferably, if the information of the terminal device includes the ticket device identifier, the controller may search a ticket group and select a ticket card corresponding to the ticket device identifier as the main card. If the information of the terminal device includes the door lock identifier, the controller may select a key card corresponding to the door lock identifier as the main card.

More preferably, if the information of the terminal device includes the personal device identifier, the controller may display the main card by searching at least one of a credit card group and a debit card group and the controller may display the terminal device.

In this case, if the displayed main card is selected and moved to the displayed terminal device, the controller may display a menu for selecting either a lend mode or a prepay mode.

And, if the lend mode is selected, the controller may send the identifier of the main card to the terminal device by excluding card information of the selected main card.

Moreover, if the prepay mode is selected, the controller may send the card information of the selected main card and a limit information of the selected main card to the terminal device.

Furthermore, the controller may send the terminal device at least one of a place information, a category information and a time information for restricting a use of the selected main card.

In another aspect of the present invention, as embodied and broadly described herein, a method of controlling a display device according to another embodiment of the present invention may include the steps of receiving terminal device's information including an identifier of the terminal device by performing a communication with the terminal device located in a preset distance, determining whether a card included in a card group exists by searching the card group associated with the received terminal device's identifier, if the card included in the searched card group exists, displaying a main card, and if the card included in the searched card group does not exist, outputting a notification message.

Accordingly, embodiments of the present invention provide various effects and/or features.

According to at least one of embodiments of the present invention, a card corresponding to an external device can be displayed by communicating with the external device.

According to at least one of embodiments of the present invention, a card search and authentication can be performed in response to a reception of a single input.

According to at least one of embodiments of the present invention, a plurality of cards related to an external device can be searched and displayed.

According to at least one of embodiments of the present invention, a card can be lent to a counterpart in various ways.

According to at least one of embodiments of the present invention, a payment function can be performed using a plurality of cards.

According to at least one of embodiments of the present invention, a user can be intuitively informed of a card search function execution and a found card.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
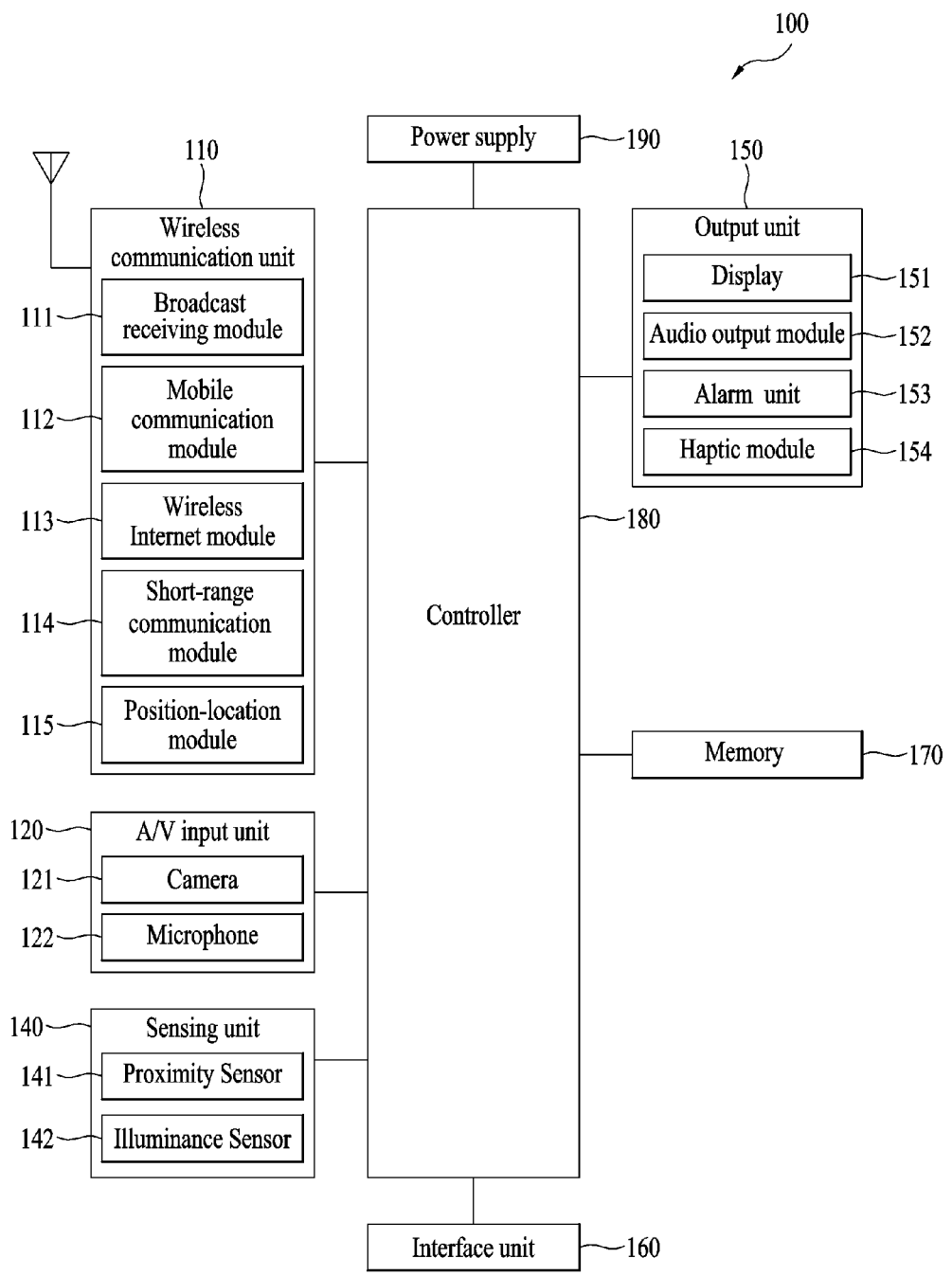
FIG. 1A is a diagram to describe a mobile terminal related to the present invention.
Figure 1B:
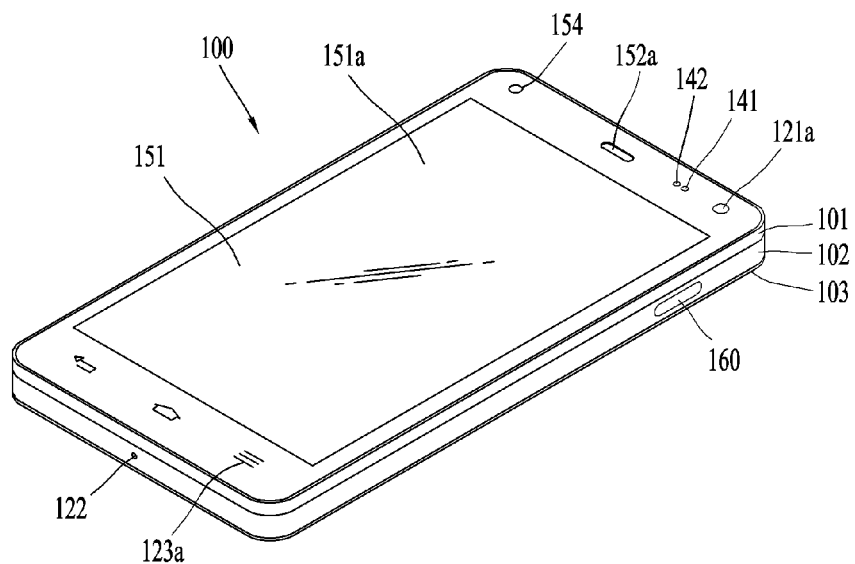
FIG. 1B and FIG. 1C are diagrams for the concept of one example of a mobile terminal related to the present invention in different views, respectively.
Figure 1C:
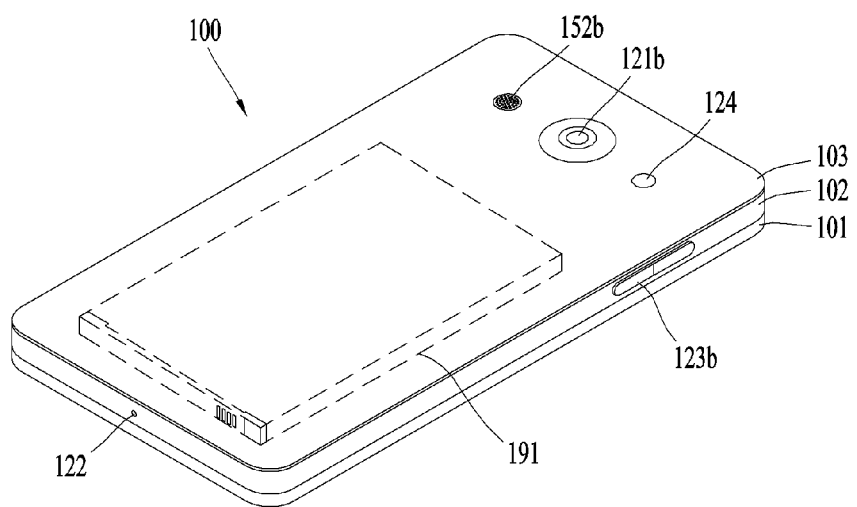

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can process or provide appropriate information or function to a user by processing signals, data, information and the like inputted or outputted through the above-mentioned components or running application programs saved in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. And, the operations, controls or controlling methods of the mobile terminal can be embodied on the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Figure 2:
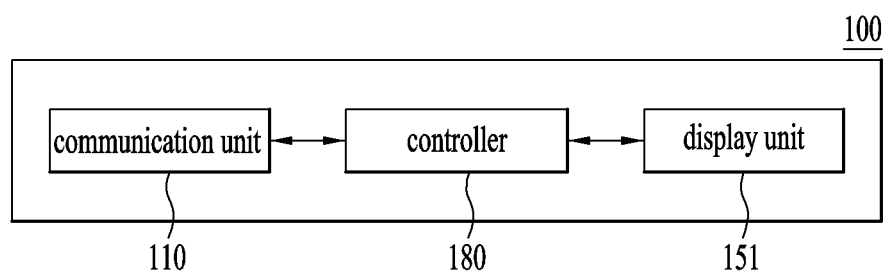
FIG. 2 is a block diagram of a display device according to one embodiment of the present invention.

FIG. 2 is a block diagram of a display device according to one embodiment of the present invention.

Referring to FIG. 2, a display device 100 may include a communication unit 110, a controller 180 and a display unit 151.

The communication unit 110 can communicate with an external terminal device located in a preset distance. The communication unit 110 can receive information on the external terminal device including an identifier of the external terminal device. For instance, the external terminal device may include one of a POS (point of sales) terminal device for payment, a cash withdrawal terminal device for cash withdrawal, a ticket barrier terminal device for checking a ticket, a ticket check terminal device, a counterpart's personal terminal device for transceiving card information, a door lock terminal device and the like. For instance, the communication unit 110 may include at least one of an NFC module, a Bluetooth module, a Wi-Fi module, a Zigbee module and the like.

In particular, the NFC module can support an inter-terminal non-contact short range wireless communication in a distance around 10 cm. The NFC module may operate in one of a card mode, a reader mode and a P2P mode. In order to enable the NFC module to operate in the card mode, the display device 100 may further include a security module configured to store card information. In case that the NFC module operates in the card mode, the display device 100 can externally deliver the card information stored like a conventional IC card. In particular, if the display device 100 storing the card information approaches an external terminal device, the display device 100 can perform an operation corresponding to the stored card information. In case that the NFC module operates in the reader mode, the display device 100 can read data from an external tag. In doing so, the data received from the tag by the display device 100 can be coded in a data exchange format defined by NFC Forum. The display device 100 can perform an appropriate operation in accordance with a type of the data received from the tag. In case that the NFC module operates in the P2P mode, the display device 100 can perform a P2P communication with another terminal device. In doing so, LLCP (logical link control protocol) may apply to the P2P communication. For the P2P communication, a connection may be established between the display device 100 and another terminal device.

If the communication unit 110 is embodied with the NFC module, the display device 100 operates in the reader mode or the P2P communication mode. Hence, when the display device 100 approaches an external terminal device in a distance of about 10 cm, the display device 100 can communicate with the external terminal device.

In case that the communication unit 110 is embodied with one of the Bluetooth module, the Wi-Fi module and the Zigbee module, the display device 100 can perform a communication with an external terminal device located in tens of meters. The display device 100 sends a signal for requesting an information to the external terminal device and is then able to receive the information of the external terminal device sent by the external terminal device having received the signal. The external terminal device may output a beacon signal periodically. If a card search program is run, the display device 100 receives the outputted beacon signal and is then able to perform a card search process based on the received beacon signal.

If the external terminal device periodically outputs a beacon signal, an output strength of the beacon signal may be adjustable depending on a type of the external terminal device. For instance, a beacon signal of the payment terminal device can be outputted with a strength enough to be received by the display device 100 located in several meters. A beacon signal of the door lock terminal device can be outputted with a strength enough to be received by the display device 100 located in tens of centimeters. Therefore, if a user intends to make a payment using the display device 100, the user can make the payment using the payment card found by the display device 100 around the payment terminal device. Moreover, another user intending to make a payment is able to make a payment around the payment terminal device.

If a user intends to open a door using the display device 100, the user can open the door using a key card, which is to be found by the display device 100, by approaching the display device 100 to the door lock.

The controller searches a card group associated with a received identifier of the external terminal device and is then able to determine whether a card included in the searched card group exists. The display device 100 can receive information of the external terminal device. The information of the external terminal device may include an identifier. The display device 100 can identify the external terminal device based on the identifier. For instance, the identifier may include information related to a function of the external terminal device. In particular, the identifier may include such an information as a payment terminal device, a cash withdrawal external device, a door lock terminal device, a ticket check terminal device or the like. The identifier may include a unique value of the external terminal device. In particular, despite the same POS terminal devices, a $1^{st}$ POS terminal device can be distinguished as 1 and a $2^{nd}$ POS terminal device can be distinguished as 2. And, the identifier may simultaneously include an information related to a function of the external terminal device and a unique identification value.

The controller 180 detects the received identifier included in the external terminal device and is then able to determine a type of the external terminal device and the like. The controller 180 can search the saved card group in accordance with the determined type of the external terminal device. For instance, the display device 100 may include a credit card group, a debit card group, a bank card group, a ticket group, a key card group and the like. The credit card group may include a credit card registered and issued to a user. The debit card group may include a debit card. The bank card group may include a bank card for withdrawing cash. The ticket group may include a card including a ticket information on a ticket issued to a user. Generally, a ticket may not be issued as a card form. Yet, in the present specification, an issued ticked is regarded as a card. The keycard group may include a card including a key related information for opening a front door, a car door or the like.

The display device 100 can determine a card group using information of a card issued to or registered by a user. For instance, the display device 100 can determine a card group using an identification information included in the corresponding card. For another instance, a user designates a card group in direct and is able to save the designated card group.

The controller 180 determines a type of the external terminal device by detecting the identifier included in the information received from the external terminal device and is then able to search a card group. For instance, if the controller 180 determines that the external terminal device is the payment terminal device, the controller 180 can search the credit card group or the debit card group. If the controller 180 determines that the external terminal device is the cash withdrawal terminal device, the controller 180 can search the back card group. After the controller 180 has searched the card group, if there are cards included in the card group, the controller 180 can control the display unit 151 to display a main card. In this case, the main card can be selected based on a card set by a user, a card used just before by a user, or the received information of the external terminal device. For instance, in case that the external terminal device is a cash withdrawal terminal device of a bank A, the controller 180 can select a card of the bank A as the main card. For another instance, in case that the external terminal device is a payment external terminal device installed at a shop for offering a discount for the use of a credit card B, the controller 180 can select the credit card B as the main card.

After the controller 180 has searched the card group, if cards included in the card group do not exist, the controller 180 can output a notification message. In particular, if a card associated with the received external terminal device does not exist, the controller 180 can control the display unit 151 to display an error message or a warning message.

The display unit 151 can display the selected main card. The display unit 151 includes a touch sensor configured to receive an input of a touch command and is able to sense a touch gesture inputted to the display unit 151.

In the following description, an embodiment for a display device 100 to communicate with an external terminal device and to select a card is explained in detail with reference to the accompanying drawing.

Figure 3A:
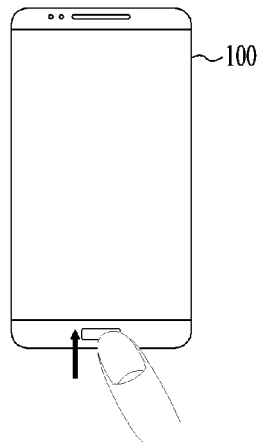
FIG. 3A to FIG. 3C are diagrams to describe one embodiment of searching for a card associated with a payment terminal device.

FIG. 3 is a diagram to describe one embodiment of searching for a card associated with a payment terminal device.

Referring to FIG. 3, a display device 100 is illustrated. The display device 100 can include an input unit disposed on a prescribed lateral side of the display unit. The input unit can receive an input of a touch gesture. According to one embodiment, the display device 100 can recognize a swipe gesture, which is inputted through the input unit, as a card search command. In particular, in case that a swipe gesture of moving on the input unit in a direction of the display unit is inputted, the display device 100 can display a card region 11 appearing from a prescribed lateral side of the display unit. According to one embodiment, the display device 100 can display the card region 11 in a direction corresponding to a moving direction of the inputted swipe gesture. In particular, the display device 100 can display the card region 11 appearing from a lateral side adjacent to the input unit among the lateral sides of the display unit. For instance, the card region 11 may include a blank region in rectangular shape. The display device 100 displays the card region 11, thereby informing a user that a card search is in progress.

Figure 3B:
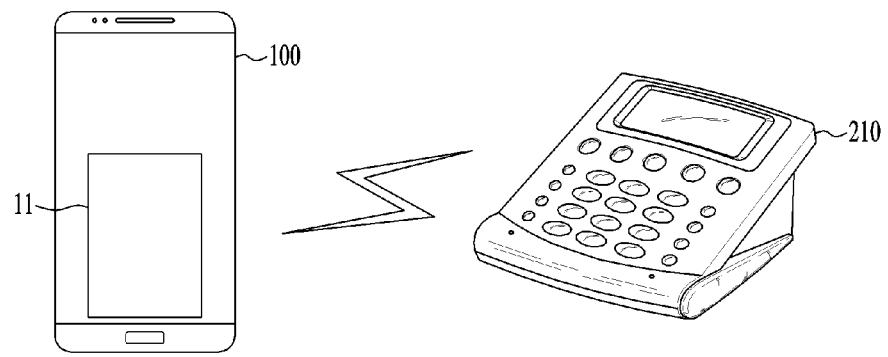

Referring to FIG. 3B, the display device 100 can communicate with a terminal device 210 located in a preset distance. After the display device 100 has displayed the card region 11, the display device 100 can communicate with the terminal device 210 located in the preset distance. And, the display device 100 can communicate with the terminal device 210 in a predetermined distance in various ways.

1$^{st}$ Embodiment of Recognizing Terminal Device

The display device 100 is able to receive data of the terminal device 210 using the NFC (near field communication) technology. The display device 100 can include an NFC module. And, the NFC module provided to the display device 100 supports an inter-terminal non-contact short-range wireless communication in a distance of about 10 cm. Moreover, the NFC module can operate in one of a card mode, a reader mode and a P2P mode.

According to one embodiment, the display device 100 can set the NFC module to enter the reader mode if a card search command is executed. In doing so, a user can approach the display device 100 to the terminal device 210. The display device 100 can read the information of the terminal device 210 from a tag of the terminal device 210 having approached in a predetermined distance. The information of the terminal device 210 may include an identifier of the terminal device. For instance, the identifier may include such information as a payment terminal device, a cash withdrawal terminal device, a door lock terminal device, a ticket check terminal device or the like. If the identifier indicates the payment terminal device, the display device 100 can recognize that the approaching terminal device 210 is the payment terminal device.

2$^{nd}$ Embodiment of Recognizing Terminal Device

The display device 100 can receive data of the terminal device 210 using Bluetooth technology. The display device 100 may include a Bluetooth module. And, the Bluetooth module provided to the display device 100 supports a short range wireless communication in a distance of about 10 m. Bluetooth enables data to be transmitted by frequency hopping. If a hoping pattern is synchronized between terminal devices, a communication can be performed.

According to one embodiment, a Bluetooth function of the terminal device 210 may be in activate state. The display device 100 can activate the Bluetooth function if a card search command is executed. The terminal device 210 may play a role as a master device and the display device 100 may play a role as a slave device. The roles of the master and slave devices are not fixed but can be switched to each other.

If the Bluetooth function is activated, the display device 100 can search for the terminal device 210 located in a predetermined distance. And, the display device 100 can be paired with the found terminal device 210.

The display device 100 can receive terminal device's information including an identifier from the paired terminal device 210. In case that the identifier indicates a payment terminal device, the display device 100 can recognize that the approaching terminal device 210 is the payment terminal device.

3$^{rd}$ Embodiment of Recognizing Terminal Device

The display device 100 can receive data of the terminal device 210 using a beacon technology. A beacon means a BLE (Bluetooth low energy) based short-range wireless communication system. The beacon can perform communications with devices located in maximum 70 m.

According to one embodiment, the terminal device 210 can output a beacon signal. The display device 100 can execute a card search command in a predetermined distance from the terminal device 210. And, the display device 100 can terminal device's information including an identifier. In case that the identifier indicates a payment terminal device, the display device 100 can recognize that the approaching terminal device 210 is the payment terminal device.

Figure 3C:
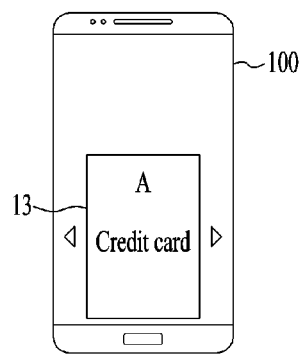

Referring to FIG. 3C, the display device 100 having a main card displayed thereon is illustrated.

The display device 100 can determine an associated card group based on a received identifier of a terminal device. For instance, based on the received identifier, the display device 100 can confirm that the corresponding terminal device is a payment terminal device. In particular, if the identifier is a payment device identifier, the display device 100 can search at least one of a credit card group and a debit card group. If there is no card included in the searched card group, the display device 100 can output a notification message. If a plurality of cards are found, the display device 100 can display one of the found cards as a main card. Based on a statistical information of a user's use pattern, the display device 100 selects a single card as a main card and is then able to display the selected card. For instance, based on the received information of the terminal device, the display device 100 analyzes a user's use pattern and is then able to select a most frequently used card as a main card. Alternatively, the display device 100 can select a most recently used card as a main card. Alternatively, based on the received information of the terminal device, the display device 100 can select a card advantageous for a user as a main card. For instance, based on the received information of the terminal device, the display device 100 can select a card having a high discount rate or a high accrual rate as a main card. In some cases, the display device 100 can select a card set by a user as a main card.

The display device 100 can display the selected main card within the card region 11. The display device 100 sets the main card displayed on the display unit as a payment card and a payment can be made through the terminal device.

1$^{st}$ Embodiment of Making Payment

The display device 100 can perform a payment procedure by NFC system. If a payment card is selected, the display device 100 can control an NFC module to operate in card mode. In case that the NFC module operates in the card mode, the display device 100 can externally deliver the saved information of the payment card. In particular, if the display device 100 maintains a predetermined distance from the terminal device 210 or if the display device 100 approaches the terminal device 210 in a predetermined distance after setting the payment card, a short-range payment procedure can be performed.

The NFC module may operate in P2P (peer-to-peer) mode. In case that the NFC module operates in the P2P mode, the display device 100 can perform a P2P communication with the external device 210. In particular, if the display device 100 approaches the terminal device 210 in a predetermined distance, the display device 100 is able to receive information from the terminal device 210. As mentioned in the foregoing description, the information of the terminal device 210 may include an identifier of the terminal device. If the display device 100 recognizes that the approaching terminal device 210 is the payment terminal device, the display device 100 can select a payment card. Once the payment card is selected, the display device 100 can externally deliver the saved information of the payment card. Thus, a procedure for the payment between the display device 100 and the terminal device 210 can be performed.

$2^{nd}$ Embodiment of Making Payment

The display device 100 can perform a payment procedure by the Bluetooth communication system. The display device 100 receives information of the terminal device 210 and is able to maintain the pairing with the terminal device 210. As mentioned in the foregoing description, the display device 100 can select a payment card. Once the payment card is selected, the display device 100 can transmit the information of the payment card to the paired terminal device 210. Thus, the procedure for the payment between the display device 100 and the terminal device 210 can be performed.

$3^{rd}$ Embodiment of Making Payment

The display device 100 can perform a payment procedure by the beacon system. The payment procedure by the beacon system may be similar to that by the Bluetooth system. In particular, after a payment card has been selected, the display device 100 can transmit the information of the payment card to the terminal device 210. Thus, the payment procedure between the display device 100 and the terminal device 210 can be performed.

$4^{th}$ Embodiment of Making Payment

The display device 100 can perform a payment procedure using the MTS (magnetic secure transmission) technology. In this case, the MST system may mean the system for making a payment by transmitting magnetic information of a card by wireless.

The display device 100 is able to receive information of the terminal device 210 using the various systems mentioned in the foregoing description. Based on the received information, the display device 100 can recommend a card to a user. The display device 100 can set the recommended card or a user-selected card as a main card. The display device 100 can transmit the magnetic information of the set card to the terminal device 210 by wireless. Having received the magnetic information, the terminal device 210 can recognize that the magnetic information of the card is read by off-line. Thus, a procedure for the payment between the display device 100 and the terminal device 210 can be performed.

The aforementioned embodiment of recognizing the terminal device and the aforementioned embodiment of performing the payment procedure can be used in a manner of being combined with each other. For instance, the display device 100 recognizes the terminal device 210 by NFC and is able to perform a payment procedure by Bluetooth. For another instance, the display device 100 recognizes the terminal device 210 by Beacon and is able to perform a payment procedure by MST. The embodiment of recognizing the terminal device and the embodiment of performing the payment procedure may be identically used for the embodiment mentioned in the following description. Yet, the embodiment of performing the payment procedure can be used in a manner of being appropriately modified in accordance with a type of a terminal device. For instance, if a terminal device is a cash withdrawal terminal device, a payment procedure may be modified into a cash withdrawal procedure. If a terminal device is a door lock terminal device, a payment procedure may be modified into a procedure for opening a door. If a terminal device is a ticket check terminal device, a payment procedure may be modified into a ticket check procedure.

Meanwhile, security is important for a financial transaction process or an unlock process to prevent leakage of personal information. Hence, the display device 100 is able to perform the financial transaction process or the unlock process in a manner of determining whether an inputted fingerprint information matches a saved fingerprint information. Like the example shown in FIG. 3A, the display device 100 receives an input of a swipe gesture for a card search. In doing so, the input unit may further include a fingerprint recognition sensor. When the display device 100 receives the input of the swipe gesture through the input unit, the display device 100 may receive an input of a fingerprint information as well. If the inputted fingerprint information matches the saved fingerprint information, the display device 100 displays a card region on the display unit and is then able to perform a communication with a terminal device. If the inputted fingerprint information fails to match the saved fingerprint information, the display device 100 does not display the card region but is able to display a notification message indicating the fingerprint mismatching.

FIG. 4 is a diagram to describe one embodiment that a plurality of external devices are found.

Figure 4A:
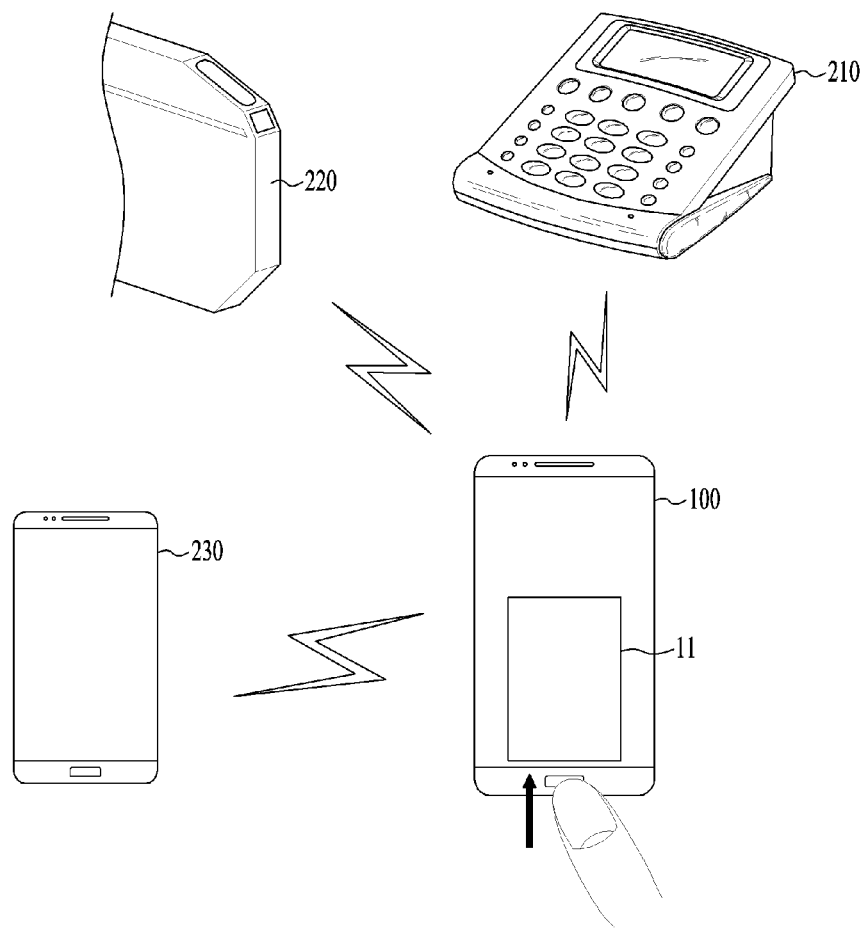
FIG. 4A and FIG. 4B are diagrams to describe one embodiment that a plurality of external devices are found.

Referring to FIG. 4A, a plurality of external terminal devices and a display device are illustrated. The display device 100 includes an input unit and is able to receive an input of a touch gesture corresponding to a card search command. For instance, the touch gesture corresponding to the card search command may include a swipe gesture. In particular, if a swipe gesture of moving in a direction of the display unit is inputted to the input unit, the display device 100 can display a card region 11. After the display device 100 has displayed the card region 11, the display device 100 is able to communicate with terminal devices 210, 220 and 230 existing in a preset distance. In case that the display device 100 includes a Bluetooth module, a Wi-Fi module or a Zigbee module, the display device 100 can communicate with the external terminal devices 210, 220 and 230 existing in a range of several meters to tens of meters. There can exist a plurality of external terminal devices 210, 220 and 230. According to one embodiment, the external terminal devices may include a POS terminal device 210, a gate terminal device 220 and a personal mobile terminal device 230. The display device 100 communicates with a plurality of the external terminal devices 210, 220 and 230 located in a predetermined distance and is able to receive information of each of the external terminal devices. The information of each of the external terminal devices may include an identifier. Hence, the display device 100 can recognize a type of each of the terminal devices. The display device 100 can recognize that the POS terminal device 210 can perform a payment function, that the gate terminal device 220 can perform a ticket check function, and that the personal mobile terminal device 230 can perform a card lending function.

Figure 4B:
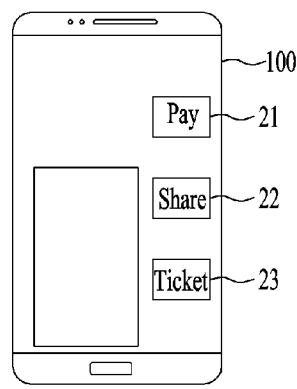

Referring to FIG. 4B, the display device having a selection menu displayed thereon is illustrated. If the display device 100 recognizes a plurality of recognizable terminal devices, the display device 100 can display a selection menu for selecting a terminal device. The display device 100 can display a menu corresponding to a function of each of the terminal devices. In particular, the display device 100 can display such menu items as 'pay' 21, 'share' 22 and 'ticket' 23. If a prescribed item is selected from the displayed menu items, the display device 100 searches a card group associated with the selected item and is able to display a prescribed card as a main card.

Alternatively, the display device 100 may display a menu item corresponding to each of the terminal devices. In particular, the display device 100 may display menu items such the POS terminal device 210, the gate terminal device 220 and the personal mobile terminal device 230 as texts or images, respectively. In particular, in case that the display device 100 receives informations of a plurality of terminal devices including different identifiers, the display device 100 can display selection menu items indicating the terminal devices based on the identifiers, respectively. Such menus shall be described in detail later.

Meanwhile, the display device 100 may receive an identifier other than the former identifier shown in FIG. 4. For instance, such an identifier may include at least one of a payment device identifier indicating a payment terminal device, a withdrawal device identifier indicating a cash withdrawal terminal device, a personal device identifier indicating a personal terminal device, a ticket device identifier indicating a ticket check terminal device, a door lock identifier indicating a digital door lock, and the like.

FIG. 5 is a diagram to describe another embodiment that a plurality of external devices are found.

Figure 5A:
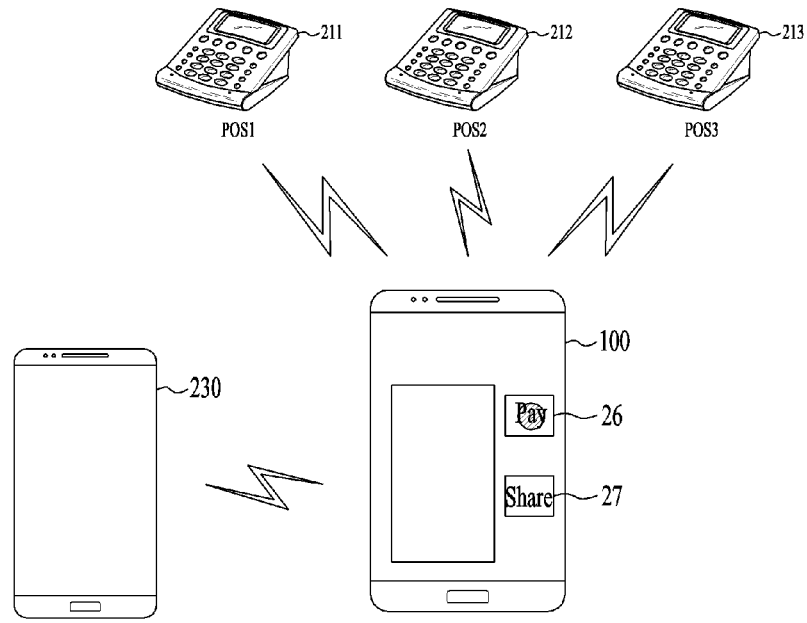
FIG. 5A to FIG. 5C are diagrams to describe another embodiment that a plurality of external devices are found.

Referring to FIG. 5A, a plurality of external terminal devices and a display device are illustrated. According to the former embodiment described with reference to FIG. 4, a plurality of the external terminal devices of different types exist. Yet, according to the embodiment described with reference to FIG. 5, a plurality of the external terminal devices of the same type exist. As mentioned in the foregoing description, the display device 100 receives an input of a card search command and is then able to display a card region. After the display device 100 has displayed the card region, the display device 100 can communicate with terminal devices 211, 212, 213 and 230 located in a predetermined distance. There can exist a plurality of the external terminal devices 211, 212, 213 and 230. According to one embodiment, there can exist a plurality of the external terminal devices 211, 212 and 213 of the same type. The display device 100 communicates with a plurality of the external terminal devices 211, 212, 213 and 230 located in the predetermined distance and is then able to receive an information of each of the terminal devices. In this case, the information of each of the terminal devices may include an identifier. The display device 100 receives the information of the corresponding terminal device and is then able to determine a type of the corresponding terminal device and a unique information of an individual terminal device. Preferentially, the display device 100 can display the terminal devices in a manner of sorting then according to function. According to one embodiment, referring to FIG. 5A, each of the external terminal devices 211, 212 and 213 of the same type may be a POS terminal device for making a payment. Hence, the display device 100 can display a pay menu item 26 corresponding to the POS terminal device. The display device 100 can display a share menu item 27 corresponding to a personal mobile terminal device 230. Alternatively, the display device 100 recognizes a terminal device with which a communication is performed and is then able to display an image of the recognized terminal device as a menu. The display device 100 may receive a command for selecting the pay menu item 26.

Figure 5B:
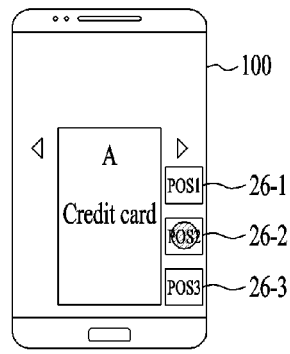

Referring to FIG. 5B, a display device currently displaying a menu for selecting a plurality of POS terminal devices is illustrated. Since the display device 100 currently recognizes a plurality of the POS terminal devices capable of performing payment functions, the display device 100 can display menu items 26-1, 26-2 and 26-3 for selecting the POS terminal devices. Meanwhile, since the display device 100 is scheduled to perform a payment process, it is able to select a main card by searching a credit card group or a debit card group. The display device 100 can display the selected main card on the display unit. In some cases, after a final terminal device has been selected, the display device 100 may select a main card by searching a card group associated with the selected terminal device. The display device 100 may receive a selection of the menu item 26-2 for selecting the $2^{nd}$ POS terminal device.

Figure 5C:
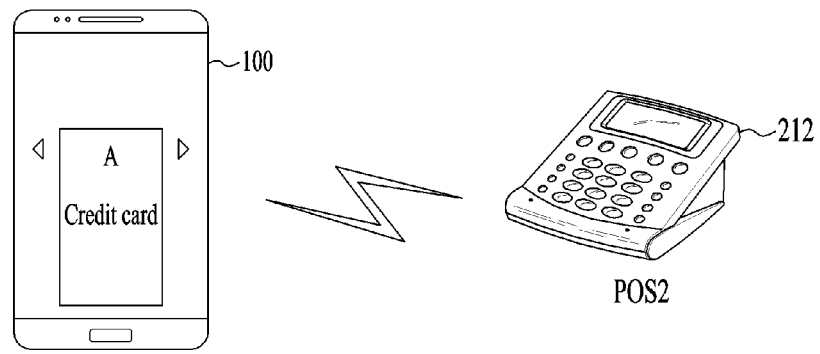

Referring to FIG. 5C, the display device currently communicating with the selected POS terminal device is illustrated. If a prescribed terminal device is selected, the display device 100 is able to communicate with the selected terminal device. FIG. 5 shows that the $2^{nd}$ POS terminal device 212 is selected. Hence, the display device 100 is able to perform a payment process by sending information of the main card to the $2^{nd}$ POS terminal device 212. In some cases, the display device 100 may include an NFC module together. In this case, the display device 100 can simultaneously perform the terminal device selection and the payment by being tagged to a prescribed terminal device in the step of selecting one of the terminal devices of the same type. The display device 100 can receive information of an external terminal device using at least one of Bluetooth, Wi-Fi and Zigbee communication systems. The display device 100 may perform a function associated with the external terminal device using the NFC communication system. In particular, the display device 100 can operate using the complex communication systems instead of using a single communication system.

FIG. 6 is a diagram to describe one embodiment of searching for a card associated with a cash withdrawal device.

Figure 6A:
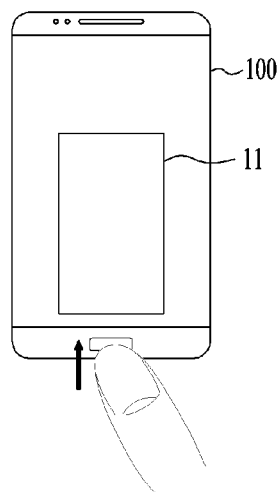
FIG. 6A and FIG. 6B are diagrams to describe one embodiment of searching for a card associated with a cash withdrawal device.

Referring to FIG. 6A, a display device 100 currently communicating with a terminal device is illustrated. The display device 100 can receives an input of a card search command through an input unit. As mentioned in the foregoing description, the display device 100 receives an input of a user's fingerprint through the input unit and may be able to perform an authentication process simultaneously. While a touch is held through the input unit, the display device 100 may be able to communicate with an external terminal device. If a touch input to the input unit is ended, the display device 100 can stop the process for the communication with the external terminal device. The display device 100 may limit a range available for the communication with the external terminal device to tens of centimeters. Hence, while the touch input through the input unit is held, if the external terminal device exists within tens of centimeters, the display device 100 can communicate with the external terminal device.

Figure 6B:
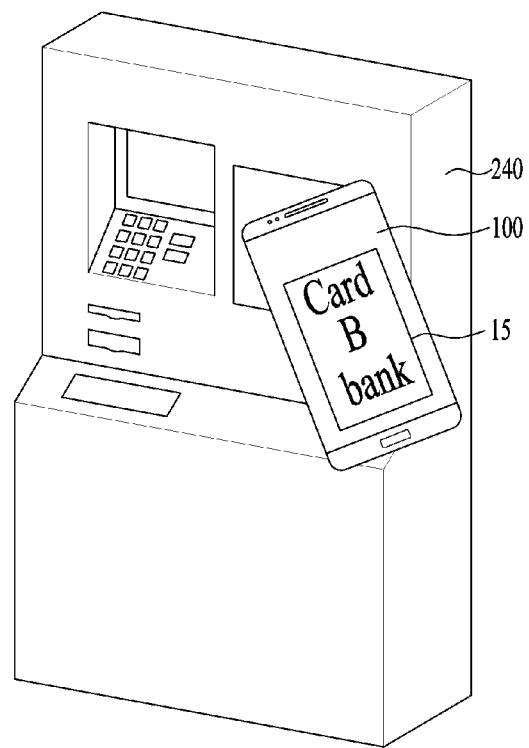

Referring to FIG. 6B, a display device currently communicating with a cash withdrawal terminal device is illustrated. The display device 100 communicates with the terminal device located in tens of centimeters, thereby being able to receive the terminal device's information including an identifier. As mentioned in the foregoing description, the identifier may include at least one of a payment device identifier indicating a payment terminal device, a withdrawal device identifier indicating a cash withdrawal terminal device, a personal device identifier indicating a personal terminal device, a ticket device identifier indicating a ticket check terminal device, a door lock identifier indicating a digital door lock, and the like. In FIG. 6B, the identifier received by the display device 100 may include a withdrawal device identifier indicating the cash withdrawal terminal device 240. Meanwhile, the information of the terminal device may include an information indicating a bank. Hence, the display device 100 can display a cash withdrawal card 15 of a specific bank as a main card based on the identifier of the cash withdrawal terminal device 240 and the information indicating the bank. According to the example shown in FIG. 6B, the display device 100 receives the identifier indicating the cash withdrawal terminal device and the information indicating a bank B and is then able to display the bank-B card 15 on a card region. In particular, if the information of the terminal device includes a unique bank information and the identifier is the withdrawal device identifier, the display device 100 can search a cash withdrawal card group. And, the display device 100 can select a cash withdrawal card corresponding to the unique bank information as the main card. The display device 100 sends the information of the displayed cash withdrawal card to the cash withdrawal terminal device 240, thereby performing a cash withdrawal process.

FIG. 7 is a diagram to describe one embodiment of searching for a card associated with a door lock.

Figure 7A:
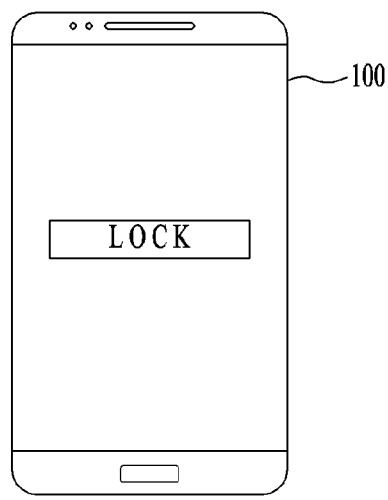
FIG. 7A and FIG. 7B are diagrams to describe one embodiment of searching for a card associated with a door lock.

Referring to FIG. 7A, a display device 100 in lock state is illustrated. A card search command or a terminal device search command can be inputted in various ways. In the present specification, the card search command is the same as the terminal device search command. The display device 100 searches for nearby terminal devices in response to the inputted command and is then able to select a prescribed card from a saved card group as a main card based on an identifier of the found terminal device.

As mentioned in the foregoing description with reference to FIG. 3, the display device 100 receives an input of a touch gesture corresponding to a card search command through the input unit, thereby being able to perform a card search process. Alternatively, as mentioned in the foregoing description with reference to FIG. 6, the display device 100 holds a touch gesture and a touch input through the input unit, thereby being able to perform a card search process.

Alternatively, the display device 100 receives an input of a preset touch gesture, thereby being able to perform a card search process. For instance, when a touch gesture in shape of 'S' is set as a gesture corresponding to a card search command, if the display device 100 receives an input of the touch gesture in shape of 'S', the display device 100 searches for a terminal device located in a predetermined range and is then able to communicate with the found terminal device. The aforementioned touch gesture shows one example only. And, it is able to variously set a gesture corresponding to a card search command.

When the display device 100 is in the lock state, if the display device 100 recognizes a terminal device located in a predetermined distance, the display device 100 may perform a card search process. In doing so, the display device 100 may search for nearby terminal devices by predetermined periods. And, a search range of the display device 100 may range from several centimeters to tens of centimeters. If the display device 100 recognizes the terminal device located in the search range, the display device 100 can communicate with the recognized terminal device.

The display device 100 may further include a separate sensor unit. In particular, the sensor unit can detect ab object located in a predetermined distance. If the object is detected through the sensor unit, the display device 100 may attempt a communication with the detected object through the communication unit. If the detected object is a communicational terminal device, the display device 100 can receive the terminal device's information including an identifier by performing a communication with the corresponding terminal device. If the detected object is not the communicational terminal device, the display device 100 can stop the operation of the communication unit.

Figure 7B:
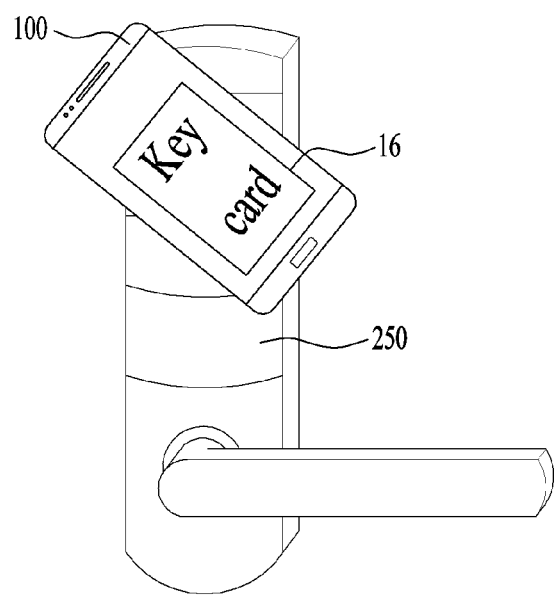

Referring to FIG. 7B, the display device 100 having detected the door lock 250 is illustrated. The display device 100 is able to detect a terminal device located in a predetermined range. The display device 100 performs a communication with the detected terminal device, thereby being able to receive the terminal device's information including an identifier. Based on the received identifier, the display device 100 can determine a type or function of the corresponding terminal device. In particular, the display device 100 can determine that the received identifier is a door lock identifier indicating the door lock. If the terminal device's information includes the door lock identifier, the display device 100 can search a key card group. And, the display device 100 is able to select a key card 16 corresponding to the door lock identifier as a main card. The display device 100 displays the key card 16 and is then able to open the door lock using the displayed key card.

FIG. 8 is a diagram to describe one embodiment of searching for a card associated with a ticket check device.

Figure 8A:
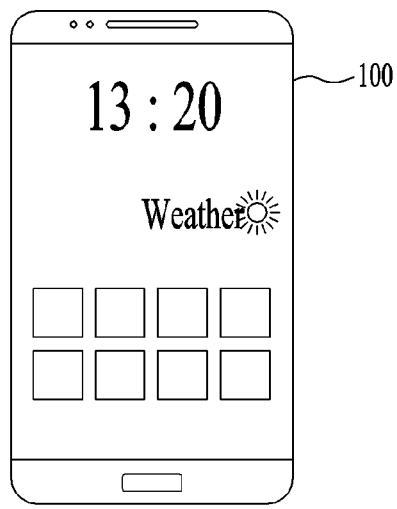
FIG. 8A and FIG. 8B are diagrams to describe one embodiment of searching for a card associated with a ticket check device.

Referring to FIG. 8A, a display device 100 in home screen state is illustrated. When a lock is released, the display device 100 recognizes a terminal device located in a predetermined distance and is then able to perform a card search process. When a home screen is displayed, the display device 100 may perform a card search process. When a specific screen is displayed, the display device 100 may perform a card search process. The display device 100 is able to search for a terminal device located in a search range by predetermined periods. If the display device 100 recognizes the terminal device located in the search range, the display device 100 can perform a communication with the recognized terminal device. The display device 100 may further include a separate sensor unit. When an object is recognized through the separate sensor unit, the display device 100 may perform a communication with the recognized object.

Figure 8B:
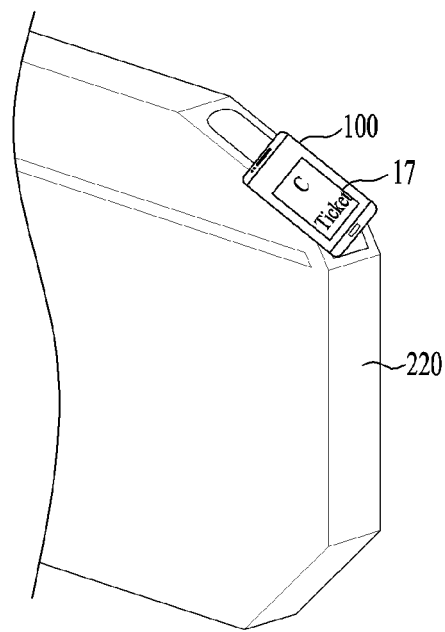

Referring to FIG. 8B, the display unit 100 having detected a ticket check terminal device 220 is illustrated. The display device 100 detects a terminal device located in a predetermined range and is able to receive the terminal device's information including an identifier. Based on the received identifier, the display device 100 is able to determine a type or function of the corresponding terminal device. In particular, the display device 100 can determine that the received identifier is a ticket device identifier indicating the ticket check terminal device 220. If the terminal device's information includes the ticket device identifier, the display device 100 can search a ticket group. And, the display device 100 is able to select a ticket 17 corresponding to the ticket device identifier as a main card. The display device 100 displays the selected ticket 17 and is able to send information of the displayed ticket 17 to the ticket check terminal device 220. For instance, the ticket included in the ticket group may include one of an admission ticket, a boarding ticket and the like.

Meanwhile, each card group may include a plurality of cards. Although the display device 100 can display a single card as a main card, a user may select another card to use.

FIG. 9 is a diagram to describe one embodiment of changing a displayed card.

Figure 9A:
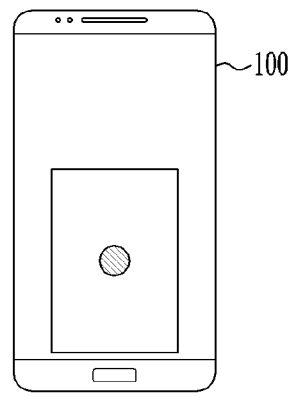
FIG. 9A to FIG. 9C are diagrams to describe one embodiment of changing a displayed card.

Referring to FIG. 9A, a display device 100 having a card application launched therein is illustrated. The display device 100 launches the card application, thereby being able to perform a card search process. The display device 100 can launch the card application in response to a user's selection.

Having launched the card application, the display device 100 can display a card region. After the display device 100 has displayed the card region, the display device 100 performs a communication with a terminal device located in a predetermined range, thereby being able to receive terminal device's information including an identifier. Alternatively, if the display device 100 launches the card application, the display device 100 can display a card region. When a touch input to the displayed card region is held, the display device 100 may perform the communication with the terminal device located in the predetermined range. A detailed process may be similar to the former process for performing a communication with a terminal device by receiving an input of a touch gesture. Since a process for performing a communication with a terminal device by receiving an input of a touch gesture is mentioned in the foregoing description, its details shall be omitted from the following description.

The display unit of the display device 100 may further include a fingerprint recognition sensor. Hence, the display device 100 can receive an input of a display device 100 information recognized on the display unit. In case that the display device 100 receives the input of the display device 100 information, the display device 100 can perform an authentication process in a manner of matching the inputted display device 100 information to a saved display device 100 information. In particular, after the card application has been launched, if the fingerprint information is inputted through the display unit, the display device 100 can compare the inputted fingerprint information to the saved fingerprint information. If the inputted fingerprint information matches the saved fingerprint information, the display device 100 can perform a communication with a terminal device located in a preset distance.

Figure 9B:
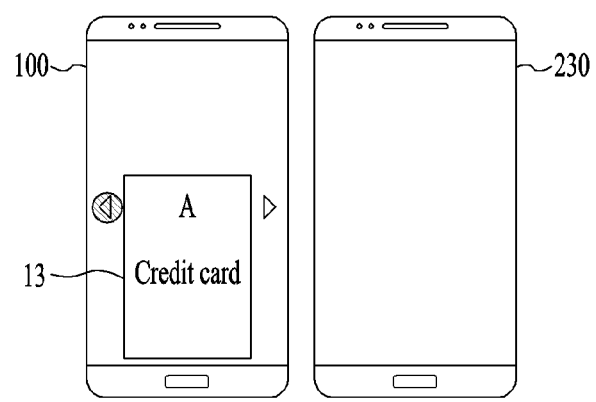

Referring to FIG. 9B, the display device 100 having a credit card selected therein and a personal mobile terminal device 230 of a counterpart are illustrated.

The display device 100 can search for a terminal device located in a predetermined range. The display device 100 can receive terminal device's information including an identifier from the found terminal device. If the found terminal device is the mobile terminal device 230, the display device 100 can receive the terminal device's information including a personal device identifier from the mobile terminal device 230. The display device 100 can share a card with the personal mobile terminal device 230. Hence, the display device 100 searches a credit card group and a debit card group and is then able to select a prescribed card as a main card. The display device 100 can display the selected main card. In this case, the main card may include a card set by a user. According to the example shown in FIG. 9B, a credit card A 13 is selected as the main card and then displayed. The main card is changeable in response to a user's selection. In case that a plurality of cards are included in the card group, the display device 100 can display a change button for changing cards in a right-to-left direction or a top-to-bottom direction.

Figure 9C:
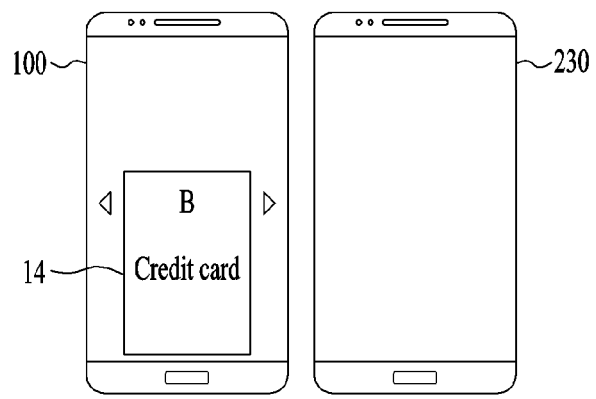

Referring to FIG. 9C, the display device 100 having the changed card displayed thereon is illustrated. The display device 100 changes a displayed card to a different card and is able to display the different card. According to the example shown in FIG. 9C, the display device 100 currently displays a screen on which the credit card A is changed to a credit card B. in response to a selection of the change button, the display device 100 can display another different card by changing the former card. After the selected card has been displayed, if the selected card is held for a predetermined time, the display device 100 can send information of the displayed card to the personal mobile terminal device 230. The card sharing shall be described in detail later.

So far, described is how the display device 100 performs the procedure by sending the information of the selected main card to the found terminal device. Using the information of the selected main card, the display device 100 may perform a payment procedure at an online site.

FIG. 10 is a diagram to describe one embodiment of using a card at an online site.

Figure 10A:
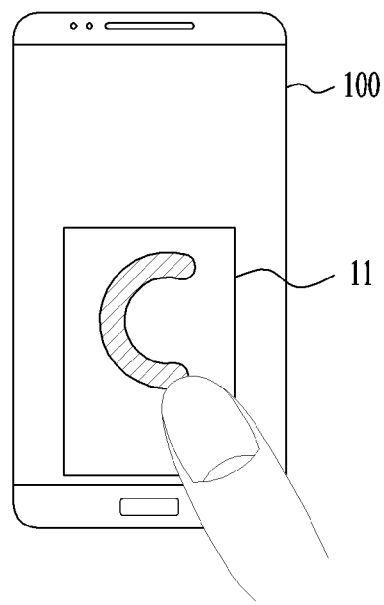
FIG. 10A and FIG. 10B are diagrams to describe one embodiment of using a card at an online site.

Referring to FIG. 10A, a display device 100 having a card region 11 displayed thereon is illustrated. The display device 100 can search for a nearby terminal device by at least one of the various methods mentioned in the foregoing description. The display device 100 can display the card region 11 represented as a blank space. A user can input a preset touch gesture to the card region 11. For instance, a touch gesture in shape of 'C' shown in FIG. 10A can correspond to an online card use command. If the display device 100 receives an input of the touch gesture in the shape of 'C', the display device 100 may stop the nearby terminal device search. And, the display device 100 can select a preset card as a main card.

Figure 10B:
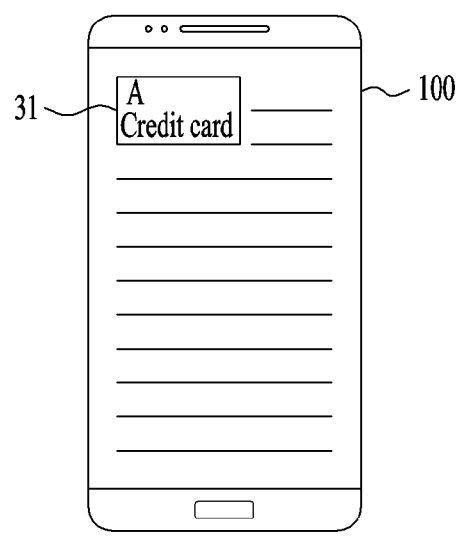

Referring to FIG. 10B, the display device 100 having an online site screen displayed thereon is illustrated. If the display device 100 receives an input of a card use command online, the display device 100 can display a main card image 31 on a random region of the display unit. The main card image 31 can move to a random location in response to a drag gesture. The display device 100 displays the online site screen as a lower layer and is able to display the main card image 31 as an upper layer. A user purchases an article at a shopping mall site and is then able to perform a payment process by dragging the floating main card image 31.

Meanwhile, a method of using a card online can be embodied in various ways.

FIG. 11 is a diagram to describe another embodiment of using a card at an online site.

Figure 11A:
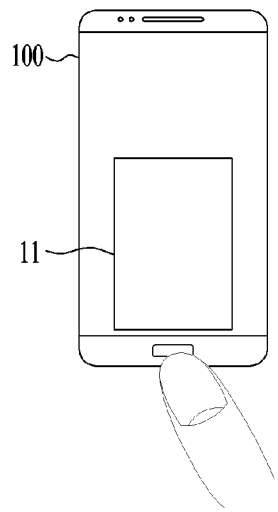
FIG. 11A to FIG. 11E are diagrams to describe another embodiment of using a card at an online site.

Referring to FIG. 11A, a display device 100 having a touch gesture inputted thereto is illustrated. As mentioned in the foregoing description, the display device 100 includes an input unit and is able to receive an input of a touch gesture corresponding to a card search command. For instance, the touch gesture corresponding to the card search command may include a swipe gesture. In particular, in case that a swipe gesture of moving on the input unit in a direction of a display unit is inputted, the display device 100 can display a card region 11.

Figure 11B:
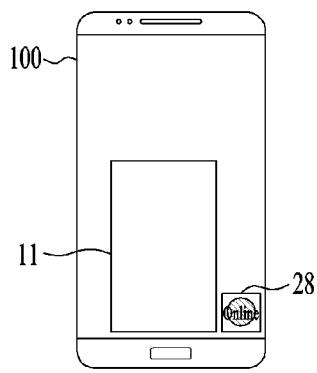

Referring to FIG. 11B, the display device 100 having a menu item displayed thereon is illustrated. The display device 100 displays the card region 11 and is able to search for an external terminal device located in a predetermined range. And, the display device 100 can display an online menu item 28 before the terminal device search. Alternatively, the display device 100 displays the online menu item 28 as soon as the terminal device search is performed. If the online menu item 28 is not selected the display device 100 can perform the search for nearby terminal devices. If the online menu item 28 is selected, the display device 100 stops the nearby terminal device search and is able to launch an online use mode.

Figure 11C:
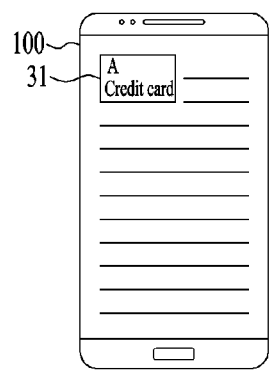

Referring to FIG. 11C, the display device 100 having the online use mode launched therein is illustrated. If the online use menu item 28 is selected, the display device 100 can select a preset card as a main card. The display device 100 can display the selected card as a main card image 31 on a random region of the display unit. The display device 100 may display the online site screen as a lower layer. And, the display device 100 may display the main card image 31 as an upper layer. A user can move to another online site. Although the display device 100 changes a display screen of an online site, the display device 100 can maintain the main card image 31 displayed as the upper layer as it is.

Figure 11D:
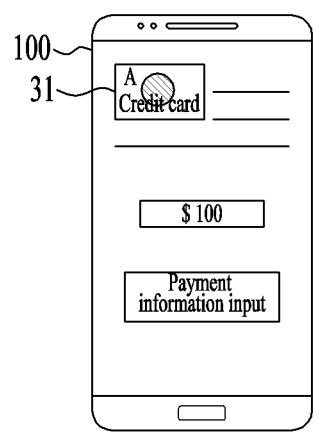

Referring to FIG. 11D, the display device 100 currently performing a payment step is illustrated. As mentioned in the foregoing description with reference to FIG. 11C, the display device 100 may display the main card image 31 as an upper layer and may display the online site screen as a lower layer. Hence, although a screen of an online site is changed in response to a user's command, the display device 100 can maintain the main card image 31 in the floating state. The display device 100 may display a screen of the payment step. While the screen of the payment step is displayed, the display device 100 may receive an input of a selection command for selecting the main card image 31.

Figure 11E:
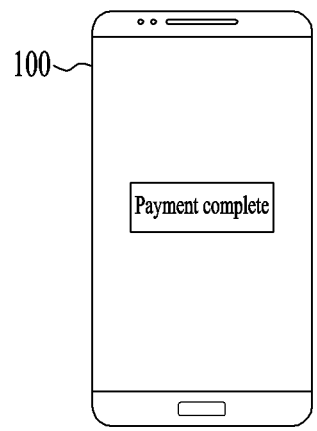

Referring to FIG. 11E, the display device 100 having a payment complete screen displayed thereon is illustrated. If the display device 100 receives the input of the selection command for selecting the main card image, the display device 100 can send a card information to a connected online site. The display device 100 may complete a card information by automatically inputting a necessary card information to a region for inputting the card information on the payment screen. The display device 100 can automatically perform the payment process by inputting or transmitting the card information. In order for a user to make a final confirmation, the display device 100 may display the card information inputted screen and wait for an input of a confirmation command. If the payment is complete, the display device 100 can display a payment complete message.

The display device 100 selects a main card on an online site and is then able to send a card information by the aforementioned method. So far, described is the embodiment for the display device 100 to select a prescribed card as a main card and to perform a process corresponding to a card function. Moreover, the display device 100 may perform such a process using a plurality of cards.

FIG. 12 is a diagram to describe one embodiment of making a payment using a plurality of cards belonging to the same type.

Figure 12A:
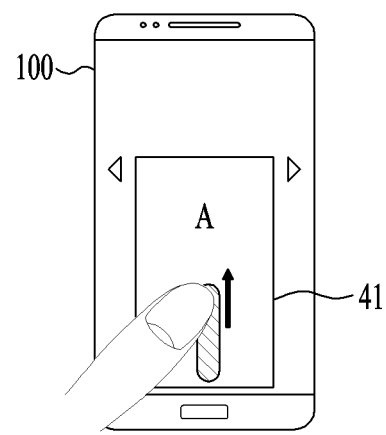
FIG. 12A to FIG. 12D are diagrams to describe one embodiment of making a payment using a plurality of cards belonging to the same type.

Referring to FIG. 12A, a display device 100 having a main card selected is illustrated. As mentioned in the foregoing description, the display device 100 receives an input of a card search command and is able to search for a terminal device located in a predetermined range. The display device 100 performs a communication with the found terminal device and is then able to receive an information including an identifier of the corresponding terminal device. The display device 100 searches an associated card group based on the received identifier of the terminal device and is then able to select a prescribed card included in the searched card group as a main card. The display device 100 can display the selected main card. If the received identifier of the terminal device is a payment device identifier indicating a payment terminal device, the display device 100 may search a credit card group or a debit card group. Like the example shown in FIG. 12A, the display device 100 selects a card A 41 as a main card and is then able to display the main card on a card region. The display device 100 can display a direction button for changing the main card. If the display device 100 receives an input of a selection command for selecting the direction button, the display device 100 changes the card A 41 to a different card and is then able to display the different card. The display device 100 may receive an input of a preset gesture for selecting a plurality of cards. According to one embodiment, if the display device 100 receives an input of a gesture of swiping in direction on the main card, the display device 100 can recognize the input as a command for selecting a plurality of cards.

Figure 12B:
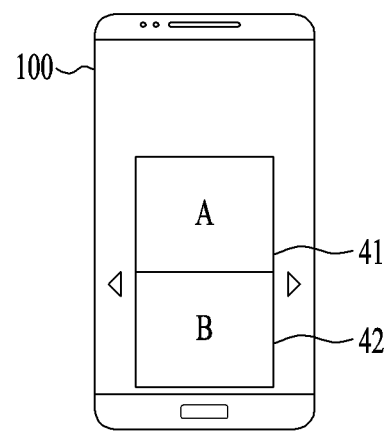

Referring to FIG. 12B, the display device 100 having two cards displayed thereon is illustrated. The display device 100 can receive an input of a preset gesture on the main card. For instance, the preset gesture may include a touch gesture of swiping from bottom to top. In response to the inputted gesture, the display device 100 can display the displayed card region in a manner of dividing the displayed card region. The display device 100 may display a card A 41 on a top region of the card region. And, the display device 100 may display a card B 42 on a bottom region of the card region. The card B 42 displayed on the bottom region may be a secondly selectable main card. The display device 100 can display a direction button for changing a card. Yet, the direction button shown in FIG. 12 9b) is the button for changing the card B 42 to a different card unlike the former direction button described with reference to FIG. 12A.

Figure 12C:
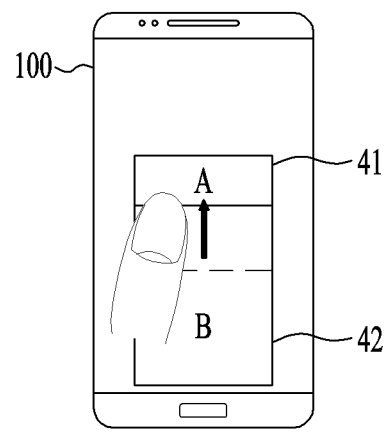

Referring to FIG. 12C, the display device 100 for changing a ratio of two cards is illustrated. A boundary line between the card A 41 and the card B 42 can be selected and moved. The display device 100 can adjust a size of the region of the card A 41 and a size of the region of the card B 42 in accordance with a movement of the boundary line. In particular, if the boundary line moves in a top direction, the size of the card A 41 decreases but the size of the card B 42 increases. If the boundary line moves in a bottom direction, the size of the card A 41 increases but the size of the card B 42 decreases.

Figure 12D:
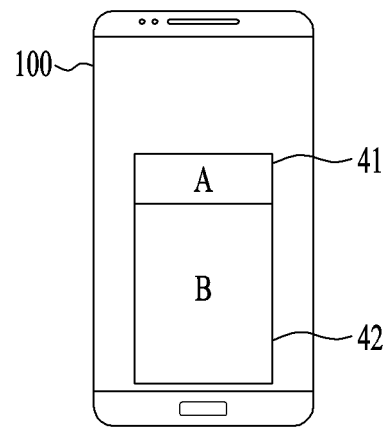

Referring to FIG. 12D, the display device 100 having the ratio of two cards changed is illustrated. The display device 100 can determine a payment ratio in accordance with a size ratio of the regions of the card A 41 and the card B 42. For instance, when it is necessary to make a payment of $100, if the size of the region of the card A 41 and the size of the region of the card B 42 amounts to 75% and 25%, respectively, the display device 100 can make the payment in a manner of enabling the card A 41 and the card B 42 to pay $75 and 25$, respectively. Meanwhile, in order for a user to intuitively recognize the ratio of the cards, the display device 100 can further display the region information.

After the display device 100 has displayed a total payment amount, the display device 100 can display an amount payable by each card in accordance with a movement of the boundary line. For instance, when the total payment amount is $100, if a region of the card A 41 is initially equal to that of the card B 42 in size, the display device 100 can display 'total amount $100', 'card A $50' and 'card B $50'. As the boundary line moves, if the region of the card A 41 decreases but the region of the card B 42 increases, the display device 100 can adjust the payment amounts of the card A and the card B in response to the movement of the boundary line.

The display device 100 may display the rates of the cards. For instance, if a region of the card A 41 is initially equal to that of the card B 42 in size, the display device 100 can display 'card A 50%' and 'card B 50%'. As the boundary line moves, if the region of the card A 41 decreases but the region of the card B 42 increases, the display device 100 can adjust the ratio of the card A and the card B in response to the movement of the boundary line.

Meanwhile, the display device 100 may select a plurality of cards of different types.

FIG. 13 is a diagram to describe one embodiment of making a payment using a plurality of cards belonging to different types.

Figure 13A:
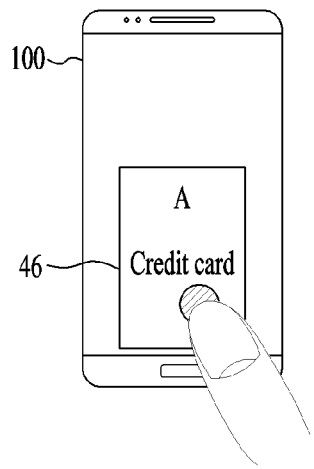
FIG. 13A to FIG. 13C are diagrams to describe one embodiment of making a payment using a plurality of cards belonging to different types.

Referring to FIG. 13A, a display device 100 having a main card selected is illustrated. As mentioned in the foregoing description, the display device 100 performs a communication with an external terminal device located in a predetermined distance, selects a prescribed card associated with the external terminal device as a main card, and is then able to display the main card. In case that the external terminal device is a payment terminal device, the display device 100 can select a credit card or a debit card as the main card. According to the example shown in FIG. 13A, the display device 100 selects and displays a credit card A 46 as a main card. The display device 100 may receive an input of a preset gesture for selecting a card of a different type. For instance, the display device 100 can recognize a touch gesture, which is inputted to the main card for a preset time, as a command for selecting a card of a different type. Alternatively, the display device 100 may recognize a touch gesture inputted over a preset pressure as a command for selecting a card of a different type. The aforementioned touch gesture types are exemplary and various gestures can be set as the commands for selecting cards of different types, respectively.

Figure 13B:
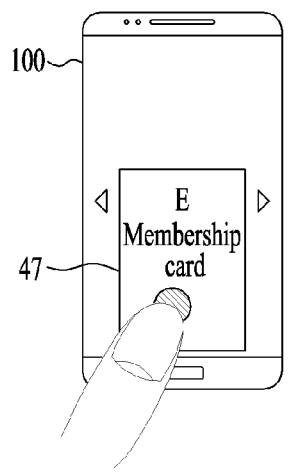

Referring to FIG. 13B, the display device 100 displaying a card of a different type is illustrated. The display device 100 can receive an input of a gesture for selecting a card of a different type. According to one embodiment, as shown in FIG. 13A, the display device 100 may receive an input of a gesture of holding a touch over a preset time. The display device 100 displays a new layer on a credit card A 46 and is able to select a prescribed card from a new card group. For instance, if a user attempts to make a payment at a shop X, the user may possess a membership card associated with the shop X. The display device 100 can receive information of a terminal device from a payment terminal device of the shop X. The information of the payment terminal device of the shop X may include an information on the shop X as well as a unique information of the terminal device. Hence, the display device 100 can select a credit card for the payment. The display device 100 is able to select the membership card of the shop X by searching a membership card group.

In particular, in case that the information of the terminal device includes the membership information, the display device 100 further searches the membership card group and is then able to select the membership card corresponding to the membership information. If a preset command is inputted to the main card displayed on the display unit, the display device 100 displays a separate card layer and is then able to display the selected membership card. The display device 100 displays a new layer, as shown in FIG. 12B, searches the membership card group, and is then able to select a membership card E 47 related to the shop X. Subsequently, the display device 100 can display the selected membership card E 47.

Meanwhile, the display device 100 can display a direction button for changing to a different card to give a selection authority of a different card to a user. If the display device 100 receives a selection command for selecting the direction button, the membership card E can be changed to a different membership card. Moreover, as mentioned in the foregoing description, if the display device 100 receives a gesture for adding a different card, the display device 100 can display a menu for selecting a different membership card in addition to the membership card E 47. For instance, if the display device 100 receives an input of a gesture of swiping on the membership card E 47 in a top direction, the display device 100 can display a UI (user interface) for adding a different card on a bottom part of the membership card E.

In response to a user's command, the display device 100 can select the membership card E 47.

Figure 13C:
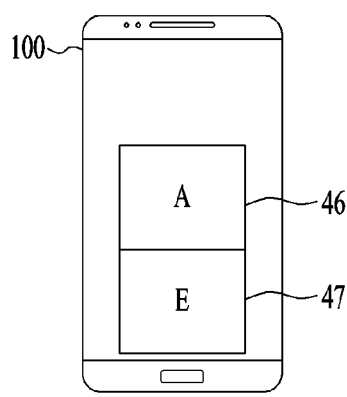

Referring to FIG. 13C, the display device 100 having two cads of different types selected is illustrated. The display device 100 can receive information of a terminal device from an external terminal device. The display device 100 recognizes that the external terminal device is a payment terminal device and is then able to select a credit card A for performing a payment function. Subsequently, the display device 100 can receive information on a shop from the received information of the external terminal device and is then able to select the membership card E related to the shop. The display device 100 can simultaneously display the finally selected credit card A 46 and the membership card E 47. The display device 100 can perform a payment process with a single operation by sending the information of the credit card A and the information of the membership card E to the external terminal device.

Meanwhile, the display device 100 may perform a payment process with a card of its own by receiving another person's card information.

FIG. 14 is a diagram to describe one embodiment of making a payment with another person's card.

Figure 14A:
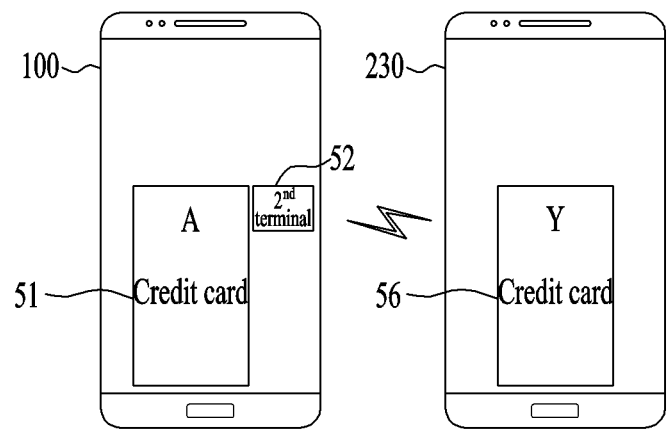
FIG. 14A to FIG. 14D are diagrams to describe one embodiment of making a payment with another person's card.

Referring to FIG. 14A, a display device 100 receiving a card information from a terminal device 230 of a counterpart is illustrated. The display device 100 receives an input of a terminal device search command and is then able to search for a terminal device located in a predetermined distance. If the display device 100 finds a terminal device of a counterpart, the display device 100 can display a menu item indicating the terminal device of the counterpart. For instance, the display device 100 can display a $2^{nd}$ terminal device item 52. And, the display device 100 can share/lend a card with/to the terminal device 230 of the counterpart. Hence, the display device 100 can display a prescribed card as a main card by searching a credit card group or a debit card group. In FIG. 14A, the display device 100 selects a credit card A 51 as a main card. If the display device 100 further searches for a payment terminal device as well as for the counterpart terminal device, the display device 100 may further display a payment terminal device item. Meanwhile, the counterpart terminal device 230 can select and display a credit card Y 56 to lend.

Figure 14B:
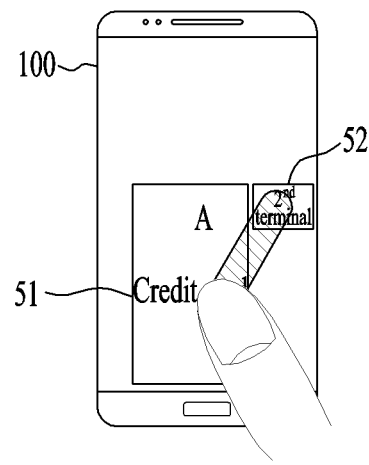

Referring to FIG. 14B, the display device 100 receiving counterpart's card information is illustrated. The display device 100 can receive an input of a gesture of moving to a region of the credit card A 51 from the displayed $2^{nd}$ terminal device item 52. If the gesture of moving to the region of the credit card A 51 from the displayed $2^{nd}$ terminal device item 52 is inputted, the display device 100 can recognize the inputted gesture as a command for performing a payment process together with the main card by receiving the card information saved in the counterpart terminal device 230. In particular, the display device 100 receives information of a credit card Y 56 from the counterpart terminal device 230 and is then able to perform the payment process together with the credit card A 51.

Figure 14C:
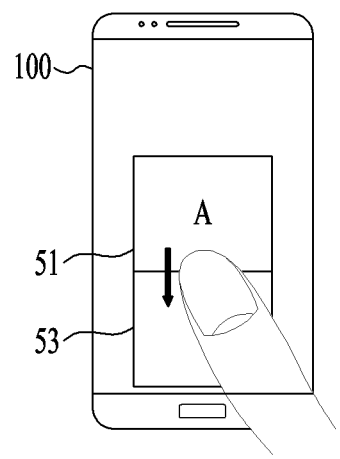

Referring to FIG. 14C, the display device 100 adjusting a card ratio of two cars is illustrated. In response to the gesture of moving to the region of the credit card A 51 from the displayed $2^{nd}$ terminal device item 52, the display device 100 receives the information of the credit card Y and is then able to display the received information of the credit card Y together with the credit card A. As mentioned in the foregoing description, the display device 100 can adjust a ratio of two cards in response to a command of touching to move a boundary line. For instance, the display device 100 may display the credit card A 51 and the credit card Y 53 on a top region and a bottom region, respectively. If the display device 100 receives a command of moving the boundary line in a top direction, the display device 100 decreases a rate of the credit card A 51 but increases a rate of the credit card Y 53. On the other hand, if the display device 100 receives a command of moving the boundary line in a bottom direction, the display device 100 increases a rate of the credit card A 51 but decreases a rate of the credit card Y 53. The display device 100 can additionally display a total payment amount and a payment amount for each card and may further display a rate of each card.

Figure 14D:
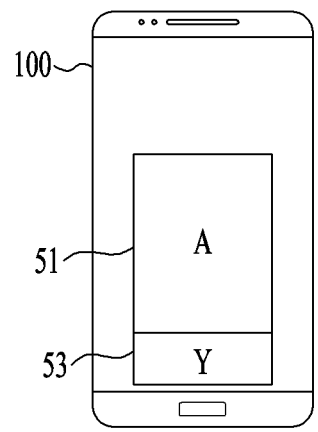

Referring to FIG. 14D, the display device 100 having a rate of each card determined is illustrated. Once the ratio of the credit card A 51 and the credit card Y 53 is determined, the display device 100 can perform a payment process in accordance with the determined ratio. Meanwhile, in the present specification, the display device 100 may perform a payment process in accordance with a determined ratio after adjusting a ratio by adding at least 3 cards by the same method.

FIG. 15 is a diagram to describe another embodiment of making a payment using a card.

Figure 15A:
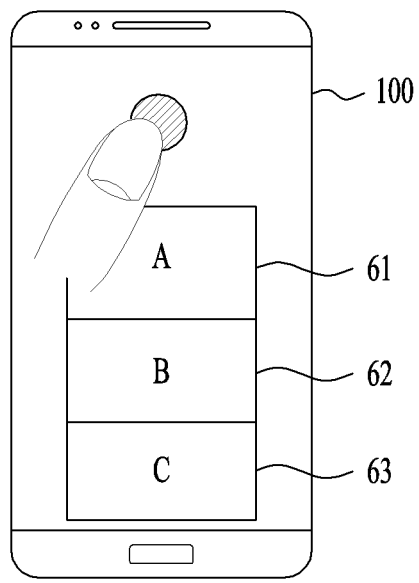
FIG. 15A and FIG. 15B are diagrams to describe another embodiment of making a payment using a card.

Referring to FIG. 15A, a display device 100 having three cards selected is illustrated. The display device 100 can select a card A 61, a card B 62 and a card C 63. As mentioned in the foregoing description, the display device 100 can select at least two cards from the saved cards. A card saved in a counterpart's terminal device can be added as well. The display device 100 can adjust a payment amount of each card by adjusting boundary lines among a plurality of the selected cards. The display device 100 determines a plurality of cards and a payment amount and is then able to perform a payment process by sending information of the displayed cards to a payment terminal device. Yet, in some cases, the payment terminal device may not receive the card information. Hence, the display device 100 may perform a payment process in a different way. The display device 100 may receive an input of a touch command for a region other than a card region.

Figure 15B:
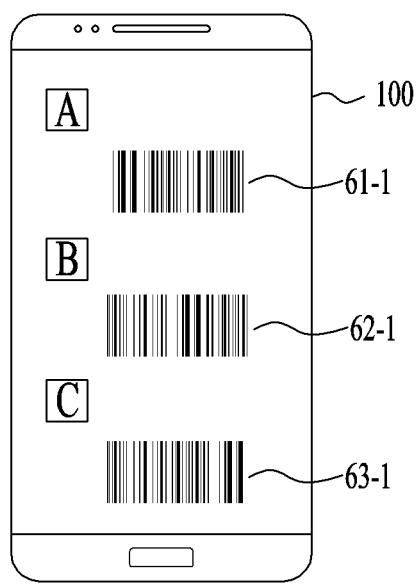

Referring to FIG. 15B, the display device 100 having barcodes displayed thereon is illustrated. If the display device 100 receives an input of a touch command for a region other than a card region, the display device 100 extracts information related to a payment from the card information and is then able to switch it. According to one embodiment, a payment terminal device may perform a payment process by reading a barcode as well as receiving the card information. Hence, the display device 100 can display a barcode of each card that can be read by the payment terminal device. In particular, the display device 100 can display a barcode 61-1 of a card A, a barcode 62-1 of a card B and a barcode 63-1 of a card C in the order shown in FIG. 15A. The display device 100 may display a determined payment amount information on a prescribed region of the corresponding barcode. And, the display device 100 may display a determined payment amount using a watermark, a QR code and/or the like.

Meanwhile, if a payment terminal device is a terminal device capable of simply reading a barcode only, the payment terminal device can perform a payment process per card by receiving an input of a payment amount manually. If a payment terminal device is a terminal device capable of reading additional information, the payment terminal device may perform a payment process based on payment amount information included in a barcode, a watermark, a QR code and/or the like.

The display device 100 receives another person's card information and is then able to make a payment together with a saved card. And, the display device 100 can perform a card lending function by sending a saved card information to another person's terminal device.

FIG. 16 is a diagram to describe one embodiment of lending a card to another person.

Figure 16A:
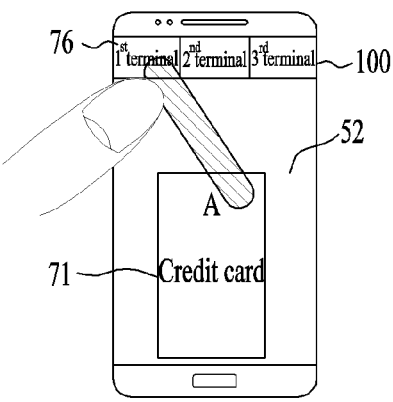
FIG. 16A to FIG. 16C are diagrams to describe one embodiment of lending a card to another person.

Referring to FIG. 16A, a display device 100 having found a plurality of mobile terminal devices is illustrated. The display device 100 may receive information including an identifier from a nearby terminal device. In this case, there may exist a plurality of nearby terminal devices. Like the example shown in FIG. 16A, if three nearby mobile terminal devices are found, the display device 100 can display the found three terminal devices. And, the display device 100 can display a card to share with the mobile terminal device. Since the card for the payment can be shared with a counterpart, the display device 100 can select a prescribed card from a credit card group or a debit card group as a main card.

In particular, if the information of the terminal device is a personal device identifier, the display device 100 displays a main card by searching at least one of the credit card group and the debit card group and is also able to display the corresponding terminal device. In this case, the selected main card may include a card previously set by a user.

The display device 100 can display a credit card A 71 selected as the main card and a found terminal device item. The display device 100 may receive an input of a gesture of moving from the credit card A 71 to a $1^{st}$ terminal device 76.

Figure 16B:
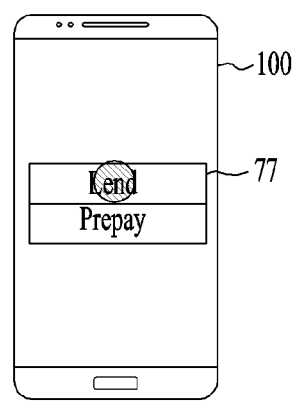

Referring to FIG. 16B, the display device 100 displaying a menu for selecting a share type is illustrated. If the display device 100 receives the input of the gesture of moving from the credit card A 71 to the $1^{st}$ terminal device 76, the display device 100 can display a menu for selecting a mode. For instance, the display device 100 can display a menu 77 for selecting a lend mode or a prepay mode. In this case, the lend mode means a mode for sending minimum information for a payment to a counterpart only. After the counterpart has received the card information in the lend mode, if the counterpart makes a payment with the received card, a consent of an owner of the corresponding card is required. The prepay mode means a mode for sending all information of a card to a counterpart together with a limitation put on a use amount. Having received the card information in the prepay mode, the counterpart can freely make a payment within the limited amount range. According to the example shown in FIG. 16B, the lend mode is selected.

Figure 16C:
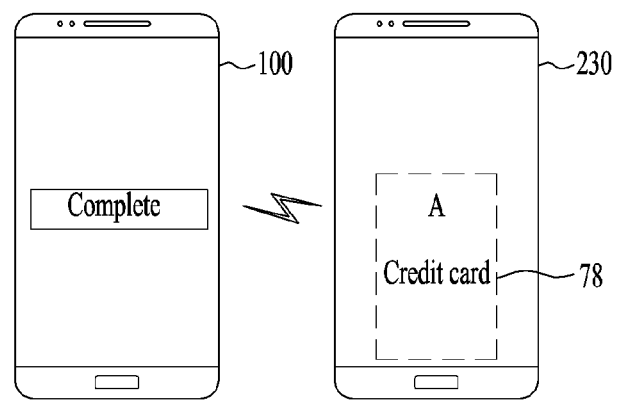

Referring to FIG. 16C, the display device 100 sending the card information in the lend mode is illustrated. If the lend mode is selected, the display device 100 can send minimum information to a counterpart terminal device 230. For instance, the display device 100 may send an identification information of the main card to the counterpart terminal device 230 only except the card information of the selected main card. Alternatively, the display device 100 may send the identification information of the display device and the identification information of the main card to the counterpart terminal device 230 only. Alternatively, the display device 100 may send the information of the main card by setting up a condition. For instance, the setting condition may include a condition of sending a notification message to the display device 100 of an owner in performing a payment operation.

If the card sharing is complete, the display device 100 may display a complete message. And, the counterpart terminal device 230 may display the shared card 78. Yet, the card 78 shared in the lend mode can be displayed with an indication indicating that a use of the card 78 is restricted. For instance, the card 78 shared in the lend mode can be displayed with a dotted line. For instance, the card 78 shared in the lend mode can be displayed semi-transparently. For instance, the card 78 shared in the lend mode can be displayed in a manner that partial information of the card is blanked.

FIG. 17 is a diagram to describe one embodiment of displaying an error occurring in lending a card.

Figure 17A:
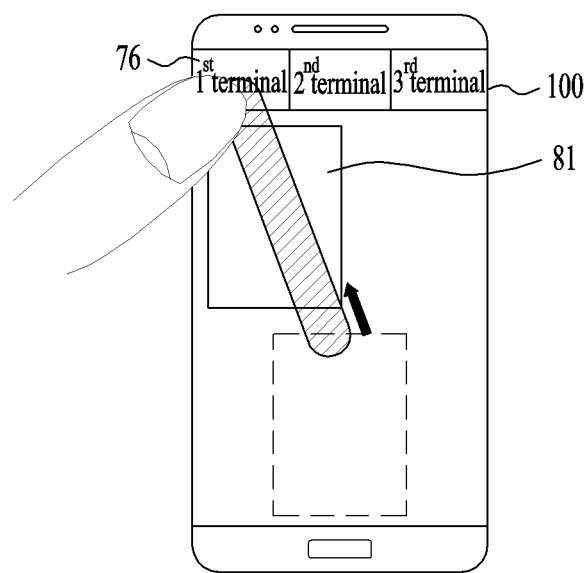
FIG. 17A and FIG. 17B are diagrams to describe one embodiment of displaying an error occurring in lending a card.

Referring to FIG. 17A, a display device 100 having a card shared is illustrated. The display device 100 can display found terminal devices and a card to share. The display device 100 can receive an input of a gesture of moving to a counterpart terminal on a displayed card. Like the example shown in FIG. 17A, the display device 100 can receive an input of a gesture of moving to a $1^{st}$ terminal device 76 from a displayed main card 81. The display device 100 can move the displayed main card 81 in response to the inputted gesture.

Meanwhile, in case of the card sharing, a predetermined security level may be required for security and safety. Hence, the display device 100 can check a security level of the counterpart terminal device 76 to which a card information will be sent. If the security level of the counterpart terminal device 76 fails to meet a required level, the display device 100 may refuse to send the card information.

Figure 17B:
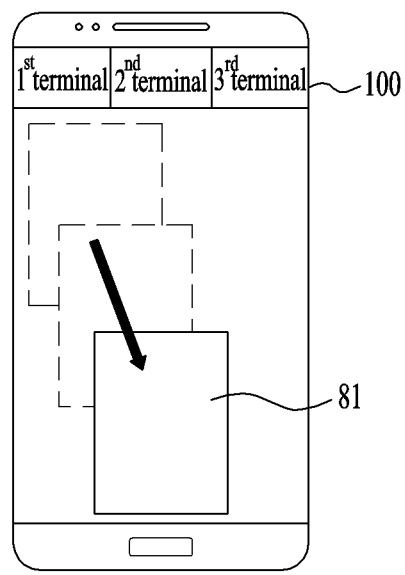

Referring to FIG. 17B, the display device 100 refusing the card sharing is illustrated. If the security level of the counterpart terminal device 76 meets the required level, the display device 100 may send the card information to the counterpart terminal device 76 or display a menu for selecting a detailed share mode. Yet, if the security level of the counterpart terminal device 76 fails to meet the required level, the display device 100 can refuse the card sharing. The display device 100 can move the main card 81 to the original location in a manner that the main card 81 is bounced from the counterpart terminal device 76. If a user interface for bouncing the main card 81 is embodied, a user can intuitively recognize that the card sharing is refused.

FIG. 18 is a diagram to describe another embodiment of lending a card to another person.

Figure 18A:
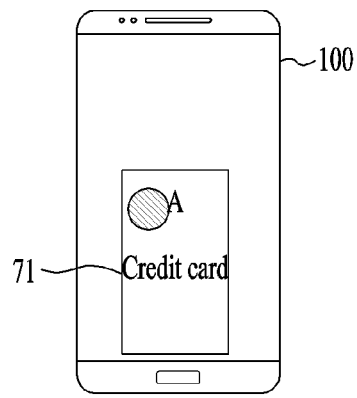
FIG. 18A to FIG. 18C are diagrams to describe another embodiment of lending a card to another person.

Referring to FIG. 18A, a display device 100 displaying a card 71 to share is illustrated. The display device 100 receives information from a counterpart terminal device, selects a card to share, and is then able to perform a card sharing operation. Yet, if the display device 100 finds a single counterpart terminal device only, the display device 100 can display a card to share only. In some cases, the display device 100 selects a card to share and a share mode and may send information to a counterpart terminal device located in a predetermined distance.

Like the example shown in FIG. 18A, the display device 100 can display the card 71 to share. The display device 100 may receive an input of a selection command for selecting a credit card A 71 to share.

Figure 18B:
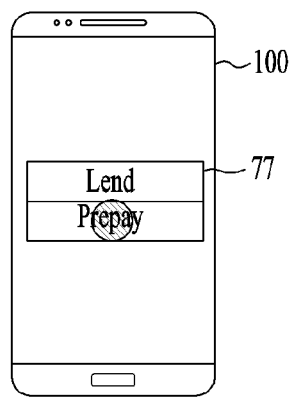

Referring to FIG. 18B, the display device 100 displaying a menu for selecting a share type is illustrated. If the display device 100 receives an input of a selection command for selecting the credit card A 71, the display device 100 can display a menu for selecting a mode. For instance, the display device 100 can display a menu 77 for selecting a lend mode or a prepay mode. In FIG. 18B, the prepay mode is selected. As mentioned in the foregoing description, the prepay mode means the mode of sending all information of a card to a counterpart together with a restriction on a user amount. Having received the card information in the prepay mode, the counterpart can freely make a payment within the restricted amount range. Hence, a user can restrict a use range of a card in sending the card information in the prepay mode.

A user can restrict a use range with reference to a use place of a lent card, a category of the lent card, a time of the lent card and the like. For instance, the user can restrict the category in a manner that the lent card is usable only in such a category as a book, stationery, or the like. For another instance, the user can restrict the time in a manner that the lent card is usable between 9 AM and 6 PM only. A restricted range setting is available for a plurality of types. Hence, the display device 100 can send such information for restricting a use of a selected main card as a place information, a category information, a time information and the like to a counterpart terminal device.

Figure 18C:
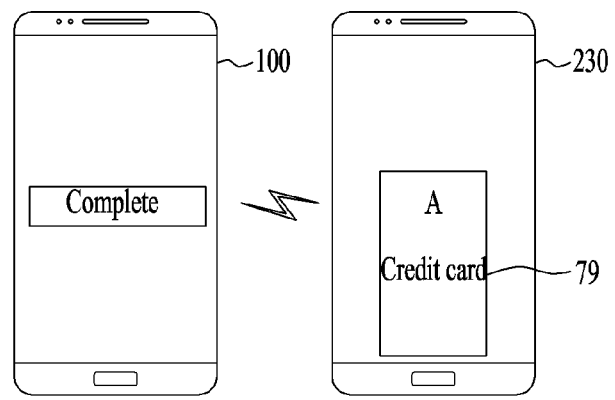

Referring to FIG. 18C, the display device 100 sending the card information in the lend mode is illustrated. If the prepay mode is selected, the display device 100 can send the card information and the use limit information to the counterpart terminal device 230. If a condition for restriction on a lent card is set, the display device 100 can send the set restriction condition together. If the card sharing is complete, the display device 100 can display a complete message. And, the counterpart terminal device 230 can display the shared card 79.

So far, the embodiment for the display device 100 to share the credit card or the debit card is described. Yet, various cards can be shared. For instance, a family membership card, a key card and the like can be used by being shared with family members. In this case, a $1^{st}$ mode corresponding to a lend mode and a $2^{nd}$ mode corresponding to a prepay mode can be set. For instance, the $1^{st}$ mode is the mode for requiring a use permission from an owner in using a corresponding card. And, the $2^{nd}$ mode is the mode for using a corresponding card freely within a predetermined range of restriction.

FIG. 19 is a diagram to describe one embodiment for another person to use a lent card.

Figure 19A:
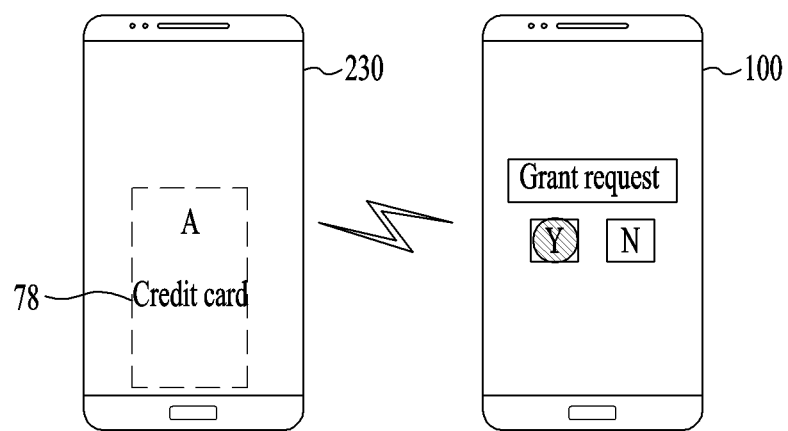
FIG. 19A and FIG. 19B are diagrams to describe one embodiment for another person to use a lent card.

Referring to FIG. 19A, a counterpart terminal device 230 making a payment using a card received in lend mode is illustrated. As mentioned in the foregoing description, the lend mode is the mode for requiring a permission from a card owner in using a corresponding card. Hence, the counterpart terminal device 230 may receive minimum information only. And, the counterpart terminal device 230 can display a card 78 received in the lend mode using a dotted line or the like. When the counterpart terminal device 230 makes a payment using information of the card received in the lend mode, the counterpart terminal device 230 can make a request for a grant to the display device 100 of the card owner. In some cases, a payment terminal device may make a request for a grant to the display device 100 of the card owner. And, the display device 100 may approve the grant request.

Figure 19B:
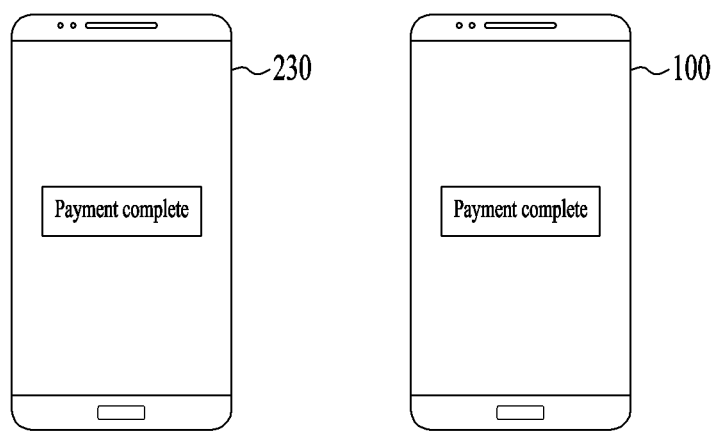

Referring to FIG. 19B, the counterpart terminal device 230 having completed the payment and the display device 100 are illustrated. In accordance with the grant of the display device 100, the counterpart terminal device 230 can perform a payment process with the payment terminal device. The payment terminal device can send a payment complete message to each of the counterpart terminal device 230 and the terminal device 100. In some cases, the payment terminal device sends the payment complete message to the counterpart terminal device 230, and the counterpart terminal device 230 may send the payment complete message to the display device 100.

FIG. 20 is a diagram to describe another embodiment for another person to use a lent card.

Figure 20A:
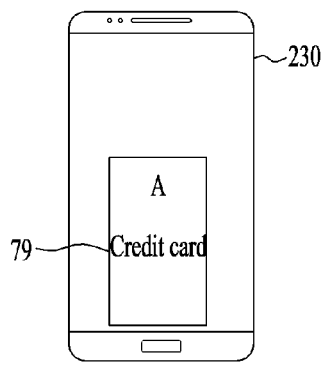
FIG. 20A and FIG. 20B are diagrams to describe another embodiment for another person to use a lent card.

Referring to FIG. 20A, a counterpart terminal device 230 making a payment using a card received in prepay mode is illustrated. As mentioned in the foregoing description, the prepay mode is the mode for freely using a card within a predetermined amount limit. The prepay mode may be the mode for freely using a card within a restricted condition range in case of a presence of a predetermined condition of restriction. Hence, the counterpart terminal device 230 can perform a payment process using a received card 79 freely within the limit or the restricted condition.

Figure 20B:
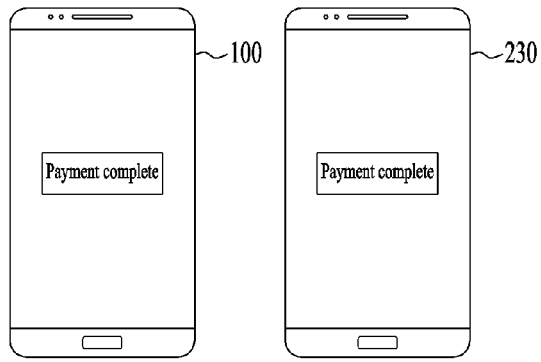

Referring to FIG. 20B, the counterpart terminal device 230 having completed the payment and the display device 100 are illustrated. If the payment is completed, the payment terminal device sends a payment complete message to the counterpart terminal device 230, and the counterpart terminal device 230 may send the payment complete message to the display device 100. Alternatively, the payment terminal device can send a payment complete message to each of the counterpart terminal device 230 and the terminal device 100. Hence, an owner of the corresponding card can check a use history of the shared card.

So far, various embodiments of the display device 100 for selecting an appropriate card by searching for a nearby terminal device and receiving information of the corresponding terminal device are described. Each of the embodiments can be used independently. The respective steps of the embodiments can be used interchangeably. For instance, a step of searching for a terminal device using a swipe gesture may be applicable to an embodiment for selecting a key card as well as to an embodiment for selecting a payment card. Moreover, a step of searching for a terminal device on a lock screen is applicable to an embodiment for selecting a payment card.

Figure 21:
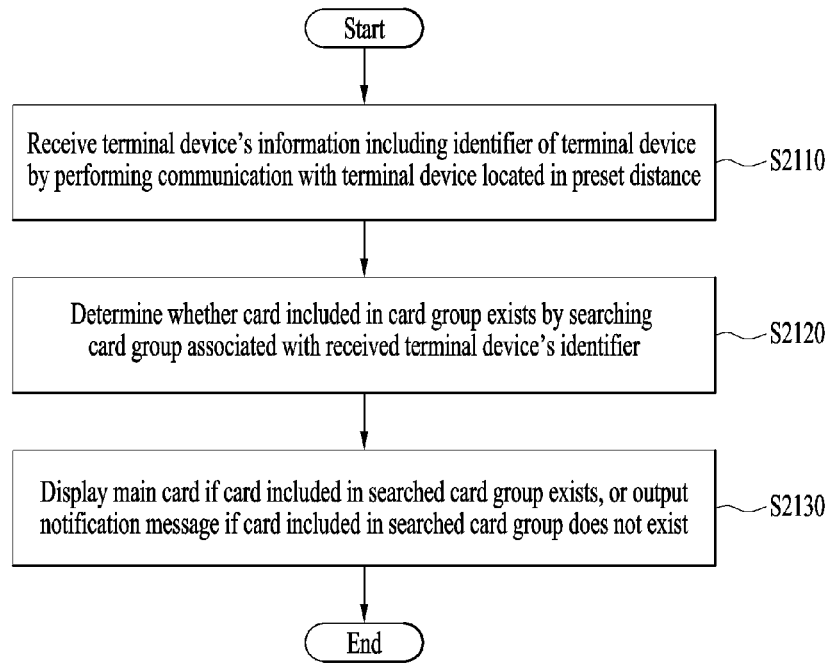
FIG. 21 is a flowchart for a method of controlling a display device according to one embodiment of the present invention.

FIG. 21 is a flowchart for a method of controlling a display device according to one embodiment of the present invention.

Referring to FIG. 21, a display device performs a communication with a terminal device located in a preset distance and is able to receive terminal device's information including an identifier of the terminal device [S2110]. The display device can display a card region by receiving an input of a gesture of moving in a direction of a display unit through an input unit. In this case, the card region may appear in a direction corresponding to a moving direction of the gesture. And, the card region may appear from one lateral side of the display unit. After the card region has been displayed, the display device can perform the communication with the terminal device in the preset distance.

The display device may perform the communication with the terminal device if the terminal device exists in the preset distance while a lock screen or an unlocked screen is displayed or a power of the display unit is turned off. Alternatively, if the display device receives an input of a terminal device search gesture, the display device can search for the terminal device located in a preset range.

The display device can determine whether a card included in a card group exists by searching the card group associated with the received identifier of the terminal device [S2120]. If the card included in the searched card group exists, the display device displays a main card. If the card included in the searched card group does not exist, the display device can output a notification message [S2130].

If the display device discovers a plurality of terminal devices, the display device can display a selection menu based on an identifier of each of the terminal devices. If a prescribed item is selected from the selection menu, the display device can search a card group related to the selected item. The display device can determine whether a card exists in the searched card group. If the card exists, the display device can select a prescribed card as a main card. For instance, the main card may include one of a recently used card, a most frequently used card, a user-set card and the like.

The above-described invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a communication unit configured to perform a communication with a terminal device located within a preset distance range;
   a display; and
   a controller coupled to the communication unit and the display, and configured to:
      cause the communication unit to receive an identifier of the terminal device located within the preset distance range, the identifier including function information of the terminal device;
      recognize a function of the terminal device based on the received identifier;
      search for a card group corresponding to the recognized function of the terminal device;
      cause the display to display at least one card image of the searched card group; and
      cause the communication unit to transmit card information corresponding to the at least one displayed card image to the terminal device located within the preset distance range such that the function of the terminal device is performed using the card information,
   wherein the identifier comprises a payment device identifier indicating a payment terminal device, a withdrawal device identifier indicating a cash withdrawal terminal device, a personal device identifier indicating a personal terminal device, a ticket device identifier indicating a ticket check terminal device, and a door lock identifier indicating a digital door lock.

2. The mobile terminal of claim 1, further comprising an input unit disposed on a prescribed lateral side of the display, wherein the controller is further configured to:
   cause the display to display a card region in response to an input of a touch gesture received via the input unit in a direction toward the display;
   cause the communication unit to communicate with the terminal device when the card region is displayed; and
   cause the display to display a main card image within the card region.

3. The mobile terminal of claim 2, wherein:
the input unit includes a fingerprint recognition sensor configured to recognize fingerprint information when the touch gesture is received; and
cause the display to display the card region when the recognized fingerprint information matches fingerprint information pre-stored at the mobile terminal.

4. The mobile terminal of claim 1, wherein:
the display includes a fingerprint recognition sensor; and
the controller is further configured to:
execute a card application;
compare fingerprint information, which is received via the display while the card application is executed and recognized by the fingerprint recognition sensor, with fingerprint information pre-stored at the mobile terminal; and
cause the communication unit to perform the communication with the terminal device if the recognized fingerprint information matches the pre-stored fingerprint information.

5. The mobile terminal of claim 1, wherein the controller is further configured to:
cause the communication unit to receive a plurality of information related to a plurality of terminal devices, the plurality of information including different identifiers respectively corresponding to the plurality of terminal devices, when the plurality of terminal devices are located within the preset distance range; and
cause the display to display a selection menu allowing selection of at least one of the plurality of terminal devices based on the different identifiers.

6. The mobile terminal of claim 1, wherein:
each of the payment device identifier, the withdrawal device identifier, the personal device identifier, the ticket device identifier, and the door lock identifier corresponds to a different type of the terminal device; and
a different function is performed at a corresponding external device according to a corresponding identifier among the payment device identifier, the withdrawal device identifier, the personal device identifier, the ticket device identifier, and the door lock identifier.

7. The mobile terminal of claim 1, wherein the controller is further configured to search for at least one of a credit card group or a debit card group based on the payment device identifier.

8. The mobile terminal of claim 7, wherein the controller is further configured to:
select a main card among a plurality of cards included in the card group based on statistical information of a usage pattern such that the main card is most frequently used with the payment terminal device; or
cause the display to display a main card image pre-set by a user as the main card.

9. The mobile terminal of claim 8, wherein the controller is further configured to process a payment by communicating with the payment terminal device using the main card as a payment card.

10. The mobile terminal of claim 8, wherein when membership information is received from the terminal device via the communication unit, the controller is further configured to search for a membership card group associated with the terminal device based on the received membership information.

11. The mobile terminal of claim 10, wherein the controller is further configured to cause the display to display a membership card image of the membership card group.

12. The mobile terminal of claim 1, wherein when unique bank information is received via the communication unit and the received identifier is the withdrawal device identifier, the controller is further configured to search for a cash withdrawal card group and select a pre-stored cash withdrawal card that is included in the cash withdrawal card group and corresponds to the unique bank information as a main card.

13. The mobile terminal of claim 1, wherein when the received identifier is the ticket device identifier, the controller is further configured to search for a ticket group and select a pre-stored ticket card that is included in the ticket group and corresponds to the ticket device identifier as a main card.

14. The mobile terminal of claim 1, wherein when the received identifier is the door lock identifier, the controller is further configured to select a pre-stored key card corresponding to the door lock identifier as a main card.

15. The mobile terminal of claim 1, wherein when the received identifier is the personal device identifier, the controller is further configured to:
search for at least one of a credit card group or a debit card group;
cause the display to display a card image associated with a card included in the at least one of the credit card group or the debit card group; and
cause the display to display information related to the personal terminal device.

16. The mobile terminal of claim 15, wherein the controller is further configured to cause the display to display a menu for selecting either a lend mode or a prepay mode in response to a touch gesture received via the display, the touch gesture starting from the displayed card image and touching the displayed information related to the personal terminal device.

17. The mobile terminal of claim 16, wherein the controller is further configured to cause the communication unit to send identification information corresponding to the card image to the personal terminal device in response to selection of the lend mode from the menu, the identification information excluding additional card information associated with the card.

18. The mobile terminal of claim 17, wherein the controller is further configured to cause the communication unit to send the additional card information to the personal terminal device in response to selection of the prepay mode from the menu, the additional information including limitation on a transaction amount that can be used by the personal terminal device.

19. The mobile terminal of claim 18, wherein the controller is further configured to cause the communication unit to send at least one selected from the group consisting of place information, category information, and time information to the personal terminal device such that use of the identification information corresponding to the card image by the personal terminal device is restricted according to the at least one selected from the group.

20. A method for controlling a mobile terminal, comprising:
communicating with a terminal device located within a preset distance range via a communication unit;
receiving an identifier of the terminal device located within the preset distance range via the communication unit, the identifier including function information of the terminal device;
recognizing a function of the terminal device based on the received identifier;

searching for a card group corresponding to the recognized function of the terminal device;

displaying at least one card image of the searched card group on a display; and transmitting card information corresponding to the at least one displayed card image to the terminal device located within the preset distance range via the communication unit such that the function of the terminal device is performed using the card information, wherein the identifier comprises a payment device identifier indicating a payment terminal device, a withdrawal device identifier indicating a cash withdrawal terminal device, a personal device identifier indicating a personal terminal device, a ticket device identifier indicating a ticket check terminal device, and a door lock identifier indicating a digital door lock.

* * * * *